(12) United States Patent
Mulvenna et al.

(10) Patent No.: US 6,817,879 B2
(45) Date of Patent: Nov. 16, 2004

(54) SERVICE PORT CONFIGURATIONS

(75) Inventors: Alan John Mulvenna, North Vancouver (CA); David Michael Routtenberg, Surrey (CA); John David Trevor Graham, Vancouver (CA); William Edward Mufford, Langley (CA)

(73) Assignee: General Hydrogen Corporation, Seattle, WA (US)

(*) Notice: Subject to any disclaimer, the term of this patent is extended or adjusted under 35 U.S.C. 154(b) by 0 days.

(21) Appl. No.: 10/306,862

(22) Filed: Nov. 25, 2002

(65) Prior Publication Data

US 2003/0162448 A1 Aug. 28, 2003

Related U.S. Application Data

(60) Provisional application No. 60/333,468, filed on Nov. 26, 2001.

(51) Int. Cl.[7] ............................................. H01R 13/62
(52) U.S. Cl. ..................................... 439/310; 439/222
(58) Field of Search ................................ 439/310, 173, 439/222, 136–143, 218, 221, 131, 34, 35, 188; 28/857, 869, 420; 320/2, 108, 104, 5; 137/614.03, 4; 285/24, 305; 220/86.2

(56) References Cited

U.S. PATENT DOCUMENTS

| | | | |
|---|---|---|---|
| 3,642,036 A | * 2/1972 | Ginsburgh et al. ............ 141/84 |
| 4,462,620 A | 7/1984 | Bambenek et al. ......... 285/162 |
| 4,881,581 A | 11/1989 | Hollerback ................. 141/113 |
| 5,272,431 A | * 12/1993 | Nee ............................... 320/2 |
| 5,306,999 A | 4/1994 | Hoffman ........................ 320/2 |
| 5,344,330 A | 9/1994 | Hoffman ..................... 439/138 |
| 5,572,109 A | * 11/1996 | Keith ............................. 320/2 |
| 5,683,117 A | * 11/1997 | Corbett et al. ................ 285/24 |
| 5,799,986 A | * 9/1998 | Corbett et al. ................ 285/55 |
| 5,850,135 A | 12/1998 | Kuki et al. ................ 320/108 |
| 6,157,162 A | 12/2000 | Hayashi et al. ............ 320/104 |
| 6,200,157 B1 | 3/2001 | Ams et al. .................. 439/409 |
| 6,202,710 B1 | 3/2001 | Dill et al. ..................... 141/94 |
| 6,351,098 B1 | 2/2002 | Kaneko ..................... 320/108 |

FOREIGN PATENT DOCUMENTS

| DE | 4213159 | * 10/1993 |
|---|---|---|
| GB | 2352886 | * 2/2001 |

* cited by examiner

Primary Examiner—Alex Gilman
(74) Attorney, Agent, or Firm—Dorsey & Whitney LLP

(57) ABSTRACT

Various service port configurations for the transfer of fluids, gases and electricity between a service terminal and a vehicle are provided. The service port includes a receptacle and a controller. The receptacle includes a clamp and a clamp actuator for actuating the clamp; a service exchange interface in between the clamp; and sensors inside the receptacle and configured to monitor the position of a plug inside the receptacle. The controller is connected to the sensors and the actuator, and monitors the sensors. When a sensor detects that a plug is in position for engagement, the controller instructs the clamp actuator to move the clamp until the plug is clamped with sufficient force to enable a service to be exchanged. The receptacle and the plug are couplable to either the service port or a vehicle and a service terminal, and both are implementable at a multiplicity of locations on a vehicle.

33 Claims, 30 Drawing Sheets

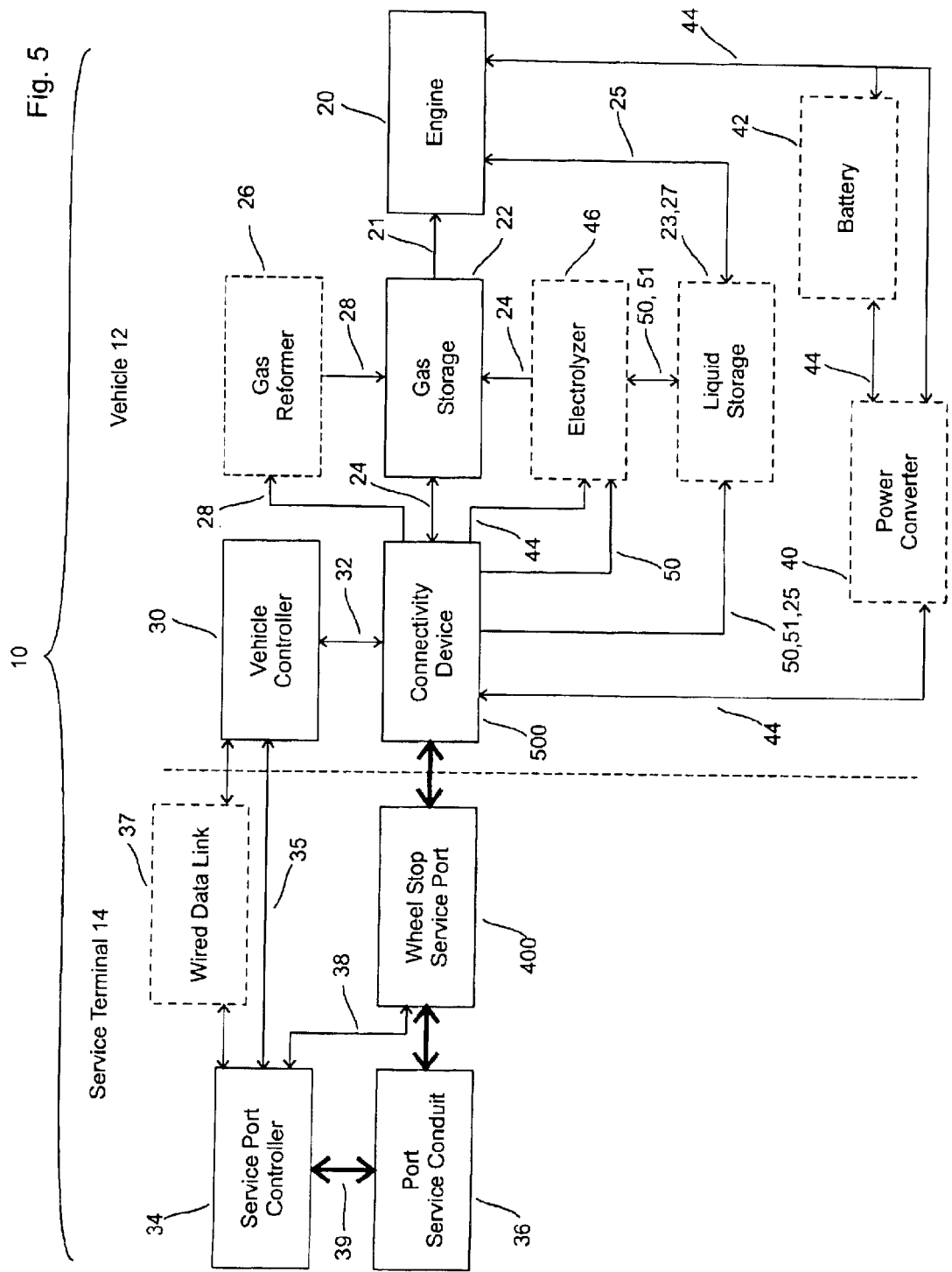

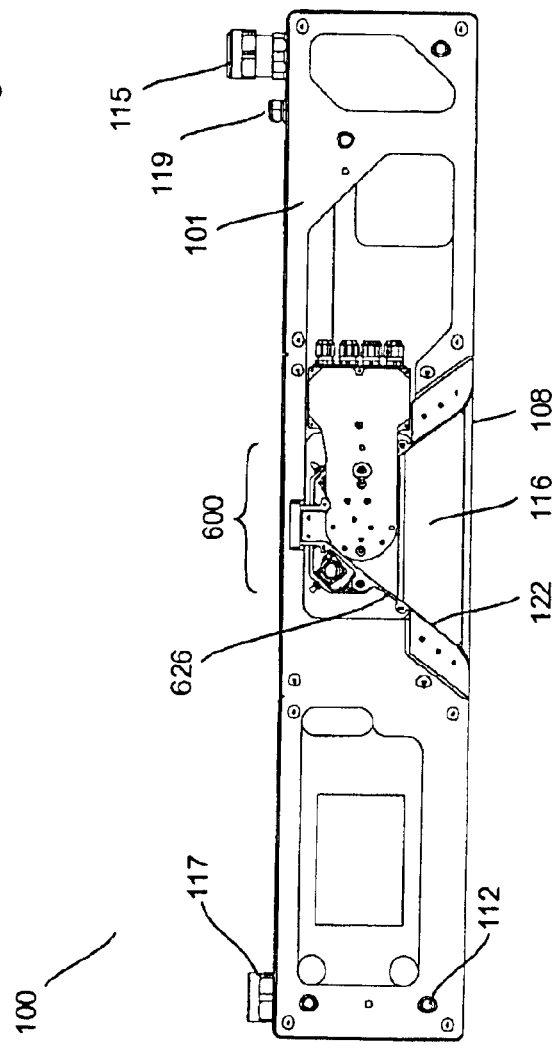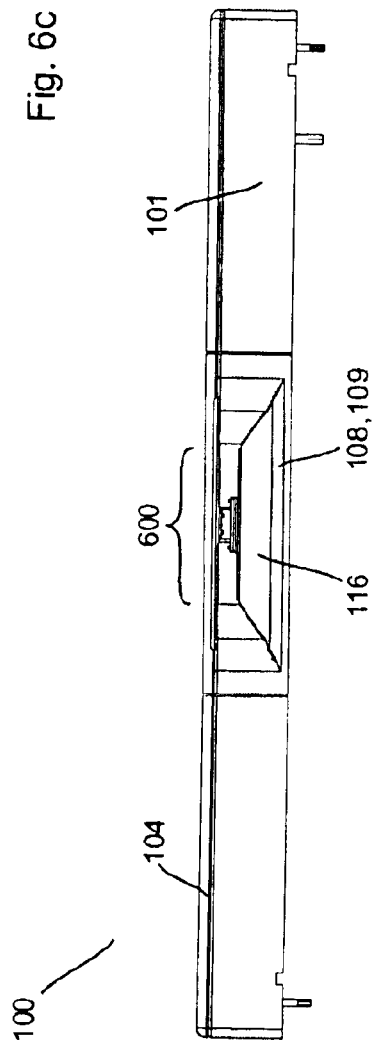

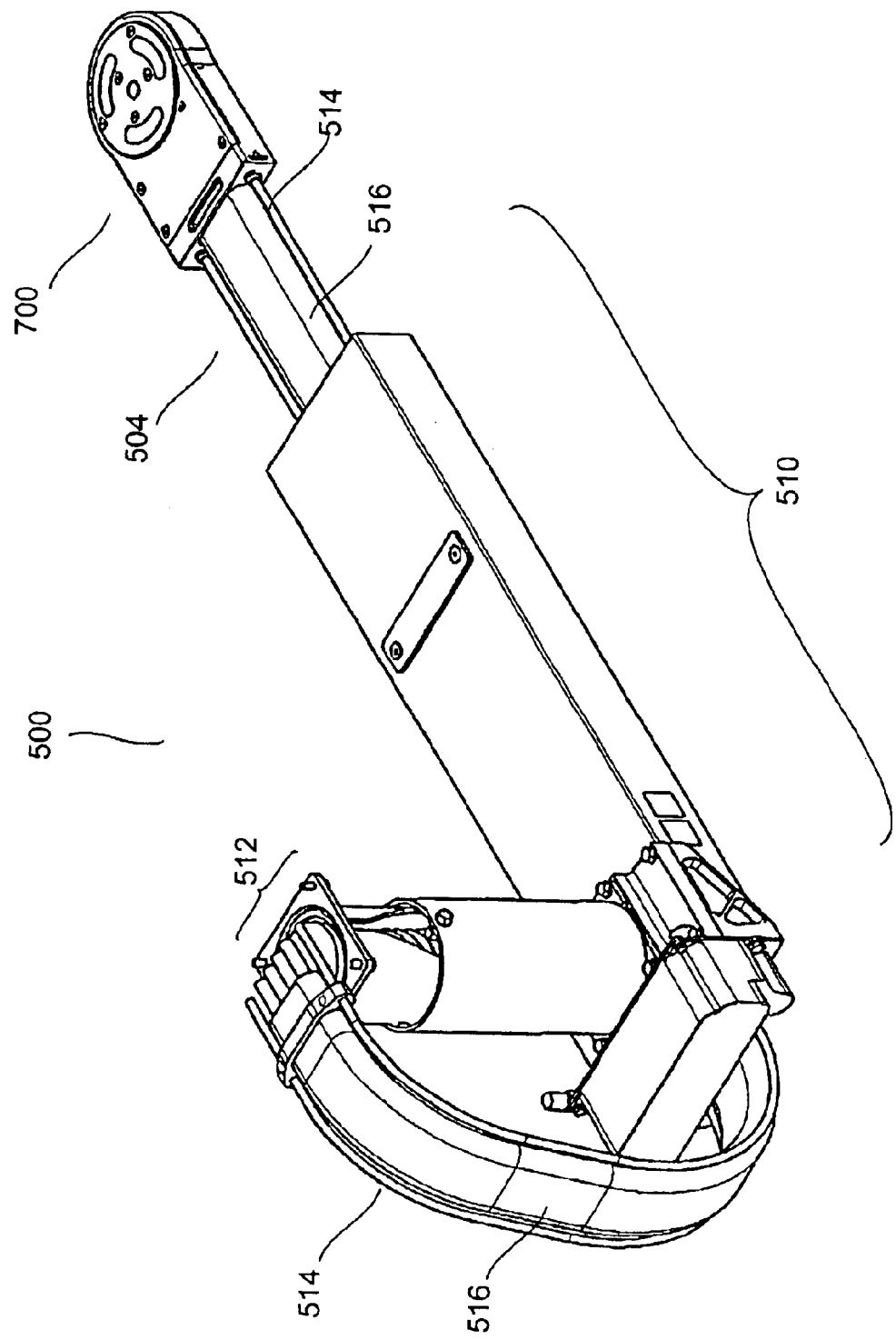

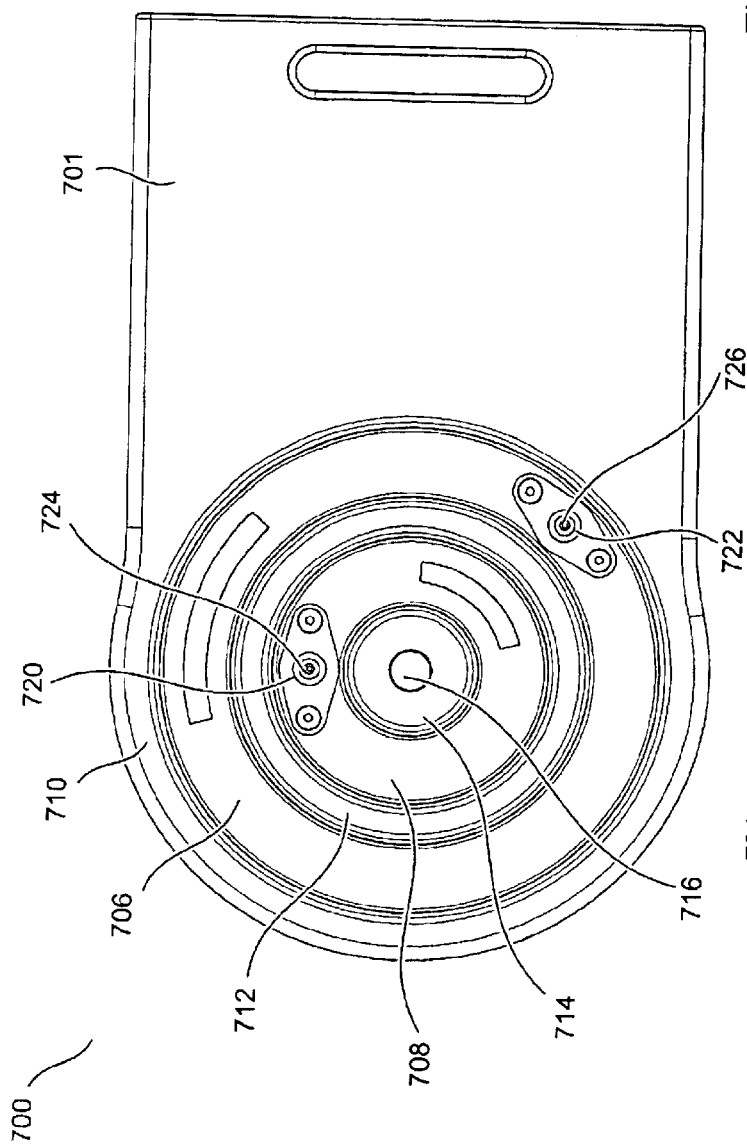
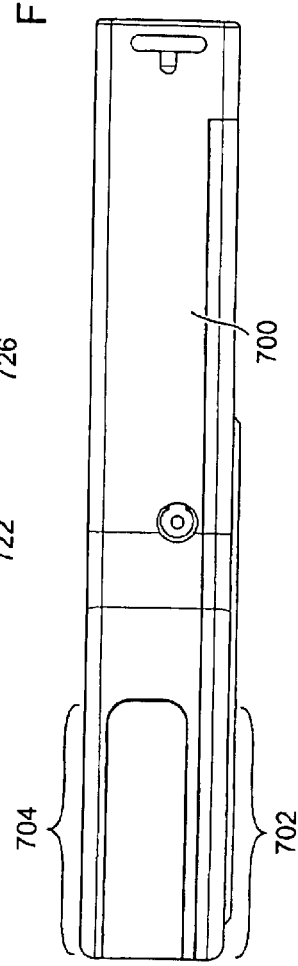

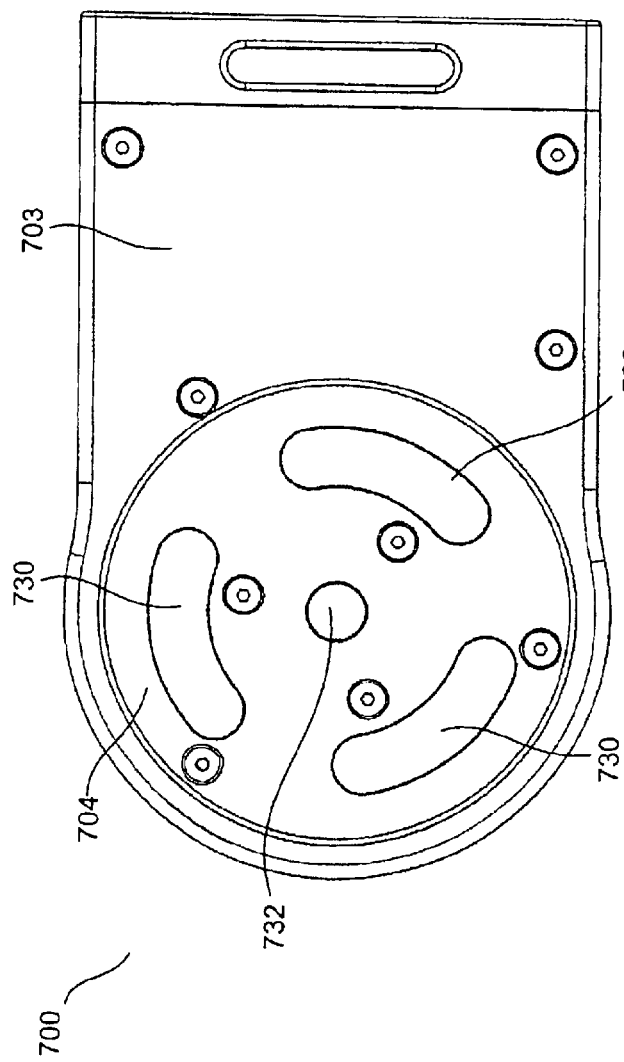
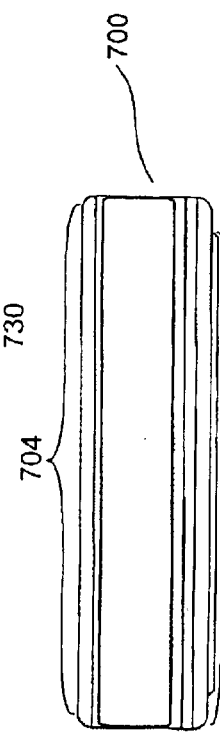
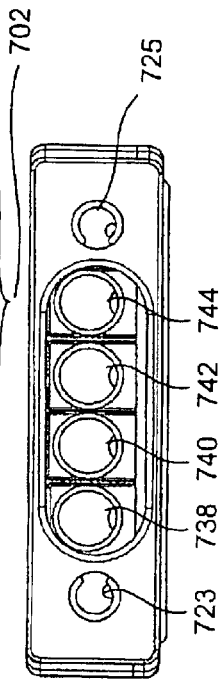
Fig. 11
Fig. 12
Fig. 13

SERVICE PORT CONFIGURATIONS

RELATED APPLICATIONS

This application claims priority from and incorporates by reference U.S. provisional application No. 60/333,468 filed Nov. 26, 2001 and U.S. application Ser. No. 10/158,389 filed on May 29, 2002.

FIELD OF THE INVENTION

The present invention relates generally to the transfer of services, which include electrical energy, fluids and information, between stationary service terminals and mobile devices, such as vehicles.

BACKGROUND OF THE INVENTION

In today's world, motor vehicles such as automobiles, trucks, and motorcycles are typically powered by internal combustion engines. In these vehicles, a liquid fossil fuel such as gasoline is ignited to transform the chemical energy in the fuel into mechanical energy that is used to drive the vehicle. Due to the scarcity of fossil fuels and the pollution from vehicles burning these fuels, alternative fuels and new vehicles powered by these alternative fuels are being developed. For example, new types of vehicles that utilize gaseous fuels are being developed and are expected to enter commercial production within the next decade.

One type of gaseous fuel powered vehicle is a fuel cell vehicle (FCV), which uses a fuel cell to electrochemically generate electricity from hydrogen fuel and uses the electricity to power the vehicle. FCVs may use pure hydrogen delivered directly from a hydrogen fueling station, or may extract hydrogen from a hydrogen-containing fuel. In the latter case, a service terminal may for example, transmit a hydrogen-containing liquid such as methanol to the FCV, for reforming into hydrogen by an on-board methanol reformer. As another example, the FCV may have an on-board electrolyzer that uses electrolysis to extract hydrogen from water molecules supplied to the vehicle by the service terminal.

Because the FCV has different servicing requirements than gasoline-powered vehicles and because no FCV has yet to enter full-scale commercial production, no FCV servicing system is known to exist. Such an FCV servicing system would require service terminals that are configured to service FCVs; for example, an FCV service terminal may have a service port that connects to an FCV and facilitates the exchange of fuel, electricity and possibly data between the FCV and the service port. Providing such an FCV service terminal presents many challenges, including providing cost-effective and efficient systems for connecting the FCV to the service port.

SUMMARY OF THE INVENTION

According to one aspect of the invention, there is provided a service port for automatically engaging a plug, wherein the plug is coupled to one and the service port is capable of coupling to the other of a vehicle and a service terminal. The service port includes a receptacle and a controller. The receptacle comprises a clamp inside the receptacle and attached to an actuator for moving the clamp between a clamped and unclamped position; a service exchange interface in between the clamp; and sensors inside the receptacle and configured to monitor the position of a plug inside the receptacle. The controller is electrically connected to the sensors and the actuator, and is programmed to monitor the sensors; when the sensors detect that a plug is in between the clamp and is in position for engagement, the controller is programmed to instruct the actuator to move the clamp until the service engagement interface engages a corresponding service exchange interface on the plug with sufficient force to enable a service to be exchanged between the interfaces.

The receptacle service exchange interface may be configured to exchange one or more services selected from the group of hydrogen, water, and electricity. When configured to exchange a fluid, the service exchange interface includes a fluid valve assembly and a fluid conduit connected to the valve assembly and connectable to one of the vehicle and the service terminal. The sensors may be further configured to detect the clamping force exerted by the clamp against the plug, and the controller may be programmed to stop operation of the actuator when sufficient clamping force is exerted on the plug to establish a fluid seal between the plug and receptacle service exchange interfaces. Furthermore, the valve assembly may include a solenoid actuator which is electrically connected to the controller, and the controller may be programmed to instruct the solenoid actuator to open a valve in the valve assembly when a fluid is to be exchanged.

When configured to exchange electricity, the receptacle service exchange interface includes an electrical contact and an electrical connector connected to the contact and connectable to one of the vehicle and the service terminal.

The clamp may comprise a stationary surface and a moveable surface attached to the actuator, and in such case, the service engagement portion may be attached to the moveable surface. Alternatively, the service engagement interface may be attached to the stationary surface. Also, the receptacle may have a pair of service exchange interfaces attached to the clamp such that the interfaces face each other in between the clamp, the interfaces being a fluid exchange interface and an electricity exchange interface. Each service engagement interface in this case may be attached to a respective clamp surface.

The receptacle may further comprise a cover attached to an actuator that moves the cover between a raised and a lowered position, and the controller may be electrically communicative with the cover actuator and be programmed to lower the cover before the plug enters the receptacle, and to raise the cover when the plug is withdrawn from the receptacle.

The service port may further comprise a transceiver electrically connected to the controller, for communicating with a vehicle or service terminal connected to the plug. In such case, the controller may be further programmed to communicate via the transceiver to the vehicle or service terminal connected to the plug a message that an engagement has been established and that the service port is ready to exchange services.

According to another aspect of the invention, there is provided a method of automatically engaging a service port and a plug, wherein the plug is coupled to one and the service port is capable of coupling to the other of a vehicle and a service terminal. The method comprises:

(a) inserting a plug into a receptacle of a service port;
(b) detecting that the plug is in position inside the receptacle for engagement;
(c) clamping the plug such that a service engagement interface on the plug engages a service engagement interface in the receptacle with sufficient force to enable a service to be exchanged between the interfaces, then (d) initiating a service exchange between the plug and service port through their respective service exchange interfaces.

The plug and receptacle service exchange interfaces may be configured to exchange one or more services selected from the group of hydrogen, water, and electricity.

The method may further comprise prior to (a), receiving instructions to initiate engagement with the plug, then lowering a protective cover to expose the receptacle to the plug;

The service engagement interfaces of the plug and receptacle may be configured to exchange a fluid, and the step of clamping in such case comprises monitoring the clamping force exerted on the plug, and increasing the clamping force on the plug until a clamping force sufficient to establish fluid seal between the plug and receptacle service exchange interfaces is detected. The step of initiating a service exchange in such a case comprises opening a fluid valve on the receptacle service exchange interface and advising the vehicle or service terminal that the service port is ready to exchange fluid.

Alternatively, the service engagement interfaces of the plug and receptacle may be configured to exchange electricity and the step of clamping then comprises monitoring the clamping force on the plug, and increasing a clamping force on the plug until a clamping force sufficient to establish an electrical connection between the plug and receptacle service exchange interfaces is detected. The step of initiating a service exchange in such a case comprises advising the vehicle and service terminal that the service port is ready to exchange electricity.

The receptacle and plug may each comprise respective fluid and electrical interfaces; in clamping the plug, the respective receptacle and plug fluid interfaces engage, and the respective receptacle and plug electrical interfaces engage, with sufficient force that both electricity and a fluid is exchangeable between the plug and service port.

According to yet another aspect of the invention there is provided a system for automatically coupling a vehicle to a service terminal such that at least one service is transferable therebetween. The system comprises a connectivity device comprising a plug with a service exchange interface, and a deployment apparatus having a proximal end capable of coupling to one of a vehicle and a service terminal, and a distal end attached to the plug; and the service port as described above, which is capable of coupling to the other of the vehicle and service terminal.

In such a system, the service port may be configured to couple to the service terminal and the connectivity device is configured to couple to the vehicle. In such case, the service port may be embeddable in a parking surface of the service terminal facing substantially upwards, and the connectivity device may be configured to couple to the vehicle facing substantially downwards and be deployable in a substantially vertical direction.

Alternatively, the service port may be mountable to an elevated housing of the service terminal facing substantially horizontally outwards, and the connectivity device may be configured to couple to the vehicle facing horizontally outwards and be deployable in a substantially horizontal direction. In such a case, the deployment apparatus may also be deployable in a substantially vertical direction, as well as rotatable about a substantially vertical axis. Furthermore, the service port may be mountable to an elevated housing of the service terminal facing substantially downwards, and the connectivity device may be configured to couple to the vehicle facing substantially upwards and be deployable in a substantially vertical direction.

The service port may be configured to couple to the vehicle and the connectivity device may be configured to couple to the service terminal. In such case, the connectivity device may be configured to couple to a wheel stop of the service terminal and be deployable in a substantially horizontal direction, and the service port may be configured to couple to the underside of the vehicle and may further comprise a deployment apparatus attached to the receptacle, for deploying the receptacle downwards to a height corresponding to the connectivity device. Alternatively, the connectivity device may be embeddable in a parking surface of the service terminal facing substantially upwards and be deployable in a substantially vertical direction, and the service port may be configured to couple to the underside of the vehicle facing substantially downwards.

Or, the connectivity device may be configured to couple to the service terminal facing horizontally outwards and be deployable in a substantially horizontal direction and the service port may be mountable to the vehicle facing substantially horizontally outwards. In such case, the connectivity device may also be deployable in a substantially vertical direction to a height corresponding to the height of the service port. The connectivity device may also be rotatable about a substantially vertical axis. Furthermore, the service port may be connected to a deployment apparatus, for deploying the service port in a substantially vertical direction to a height corresponding to the height of the connectivity device.

BRIEF DESCRIPTION OF THE DRAWINGS

FIG. 5 is a system block diagram of a service terminal and a terminal-compatible vehicle, wherein liquid and gaseous fuels, water, electricity and data are exchangeable between the terminal and vehicle.

FIGS. 6(a) to (c) are perspective, plan and front elevation views of a service port mounted in a wheel stop.

FIG. 7 is a perspective view of a connectivity device mountable to a vehicle.

FIG. 9 is a bottom plan view of the plug showing the plug fluid exchange interface.

FIG. 10 is a side elevation view of the plug.

FIG. 11 is a top plan view of the plug showing the plug electricity exchange interface.

FIG. 12 is a distal end elevation view of the plug.

FIG. 13 is a proximal end elevation view of the plug.

DETAILED DESCRIPTION

System

Figure 1:
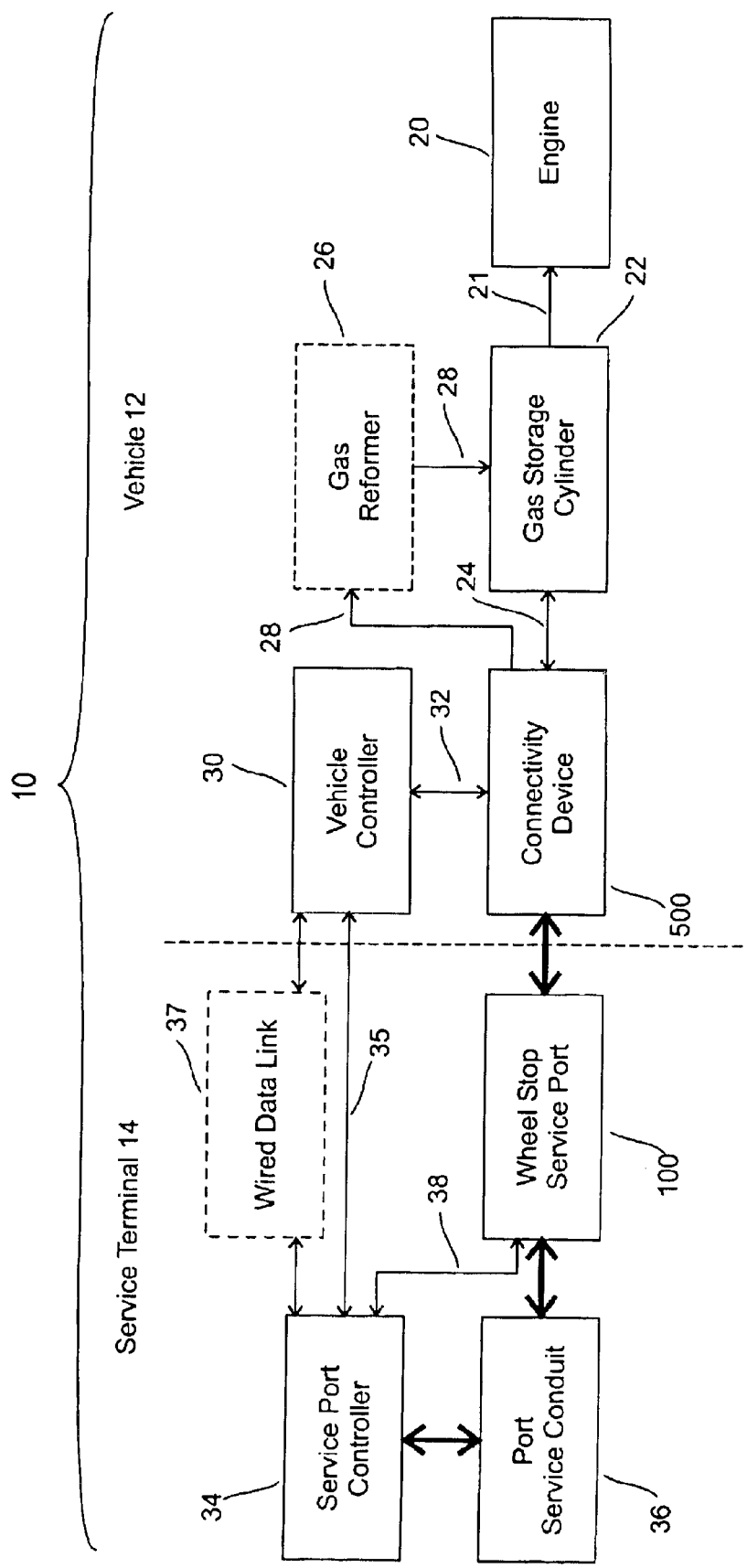
FIG. 1 is a system block diagram of a service terminal and a terminal-compatible vehicle, wherein a gaseous fuel and data are exchangeable between the terminal and vehicle.

FIGS. 1–5 illustrate different embodiments of a system 10 for transferring one or more of energy, material or data (collectivity referred to as "services") between system-compatible vehicles 12 and a stationary service terminal 14. The service terminal 14 may be integrated into a building or pre-existing structure, or be part of a dedicated vehicle service terminal building; or, the service terminal may be made mobile by, for example, integrating into a refueling vehicle. In each illustrated embodiment, the service terminal 14 has a service port 100 and the vehicle 12 has a connectivity device 500 that can couple to the service port 100. However, as will be described later, the service port 100 may be located on the vehicle 12 and the connectivity device 500 on the service terminal 14. Other major components of the service terminal 14 include a service port controller 34 for controlling the transfer of services by the service port 100, and a port service conduit 36 for coupling the service terminal 14 to one or more service destinations (not shown). The destination may be a service source when the service is to be transferred from the source to the vehicle 12; for example, the service source may be a fuel tank that supplies fuel to the vehicle 12 when coupled to the service terminal 14. Or, the destination may be a service consumer when the service is to be transferred from the vehicle 12 to the consumer; for example, the service terminal 14 may be connected to a power grid, and the consumer may be an electricity user connected to the grid that receives electricity generated by a fuel cell onboard the vehicle 12 and transferred to the grid when the vehicle 12 is connected to the service terminal 14.

The system 10 is particularly suitable for providing services to fuel cell and regenerative fuel cell vehicles, but can also serve vehicles powered by other means, such as natural gas, electricity, etc. The vehicle 12 has a number of components that make it compatible with the service terminal; the type of components depend on what services are being transferred.

FIG. 1 illustrates a system 10 that transfers gaseous fuel between the vehicle 12 and the service terminal 14. The gaseous fuel may be hydrogen. The vehicle 12 is suitably any known vehicle that can operate on gaseous fuels, such as fuel cell vehicles (FCV), regenerative fuel cell vehicles (RFCV), and internal combustion engine vehicles (ICEV). The vehicle 12 includes a gaseous fuel compatible engine 20, and a gas storage cylinder 22 fluidly connected to the engine 20 and the connectivity device 500 by a gas line 24. The connectivity device 500 has a fluid exchange interface (not shown) that is sealably connectable to a fluid exchange interface (not shown) of the service port 100 to enable the transfer of gas between the vehicle 12 and the service terminal 14. Optionally, a gas reformer 26 is provided that is connected to the connectivity device 500 and the gas storage cylinder 22 via another gas line 28, so that gaseous fuel transmitted from the service port 100 can be first reformed before being stored in the gas storage cylinder 22 and used by the engine 20. Gas lines 24 and 28 are bi-directional to enable fuel to be transmitted from the service terminal 14 to the vehicle 12, or vice versa.

The connectivity device 500 is electrically communicative with a vehicle controller 30 via control signal wire 32, which controls operation of the connectivity device 500; for example, the vehicle controller 30 provides automatic connection and gas transfer control signals to control the transfer of gaseous fuel through the connectivity device 500. The vehicle controller 30 has a transceiver (not shown) to exchange data wirelessly with a transceiver (not shown) in a service port controller 34 of the service terminal 14 (wireless link shown as 35). The construction of the controllers 30, 34 are known in the art. Optionally, a wired data link 37 may be substituted for the transceivers; in such case, data line connection points (not shown) are provided on each of the service port 100 and the connectivity device 500, that connect when the service port 100 and the connectivity device 500 are coupled or alternatively data can be sent over the electrical power connections. The data communicated to and from the vehicle controller 30 relates to providing data-related services that include vehicle identification, initiating connection, and fueling processes.

The port service conduit 36 is fluidly connected to the service port 100 and an off-vehicle fuel source/destination, and is electrically connected to the service port 100 and the service port controller 34 and an off-vehicle electricity source/destination. Optionally, a control signal wire 38 may be provided to link the service port controller 34 directly to the service port 100 and enable direct communication between the two components. The port service conduit 36 may be fluidly connected to storage tanks (not shown) of the service terminal 14 that may be supplied fuel from time to time by refueling tankers (not shown), or to a fluid pipeline (not shown) in a gas distribution network (not shown) for the continuous supply of fuel.

Figure 2:
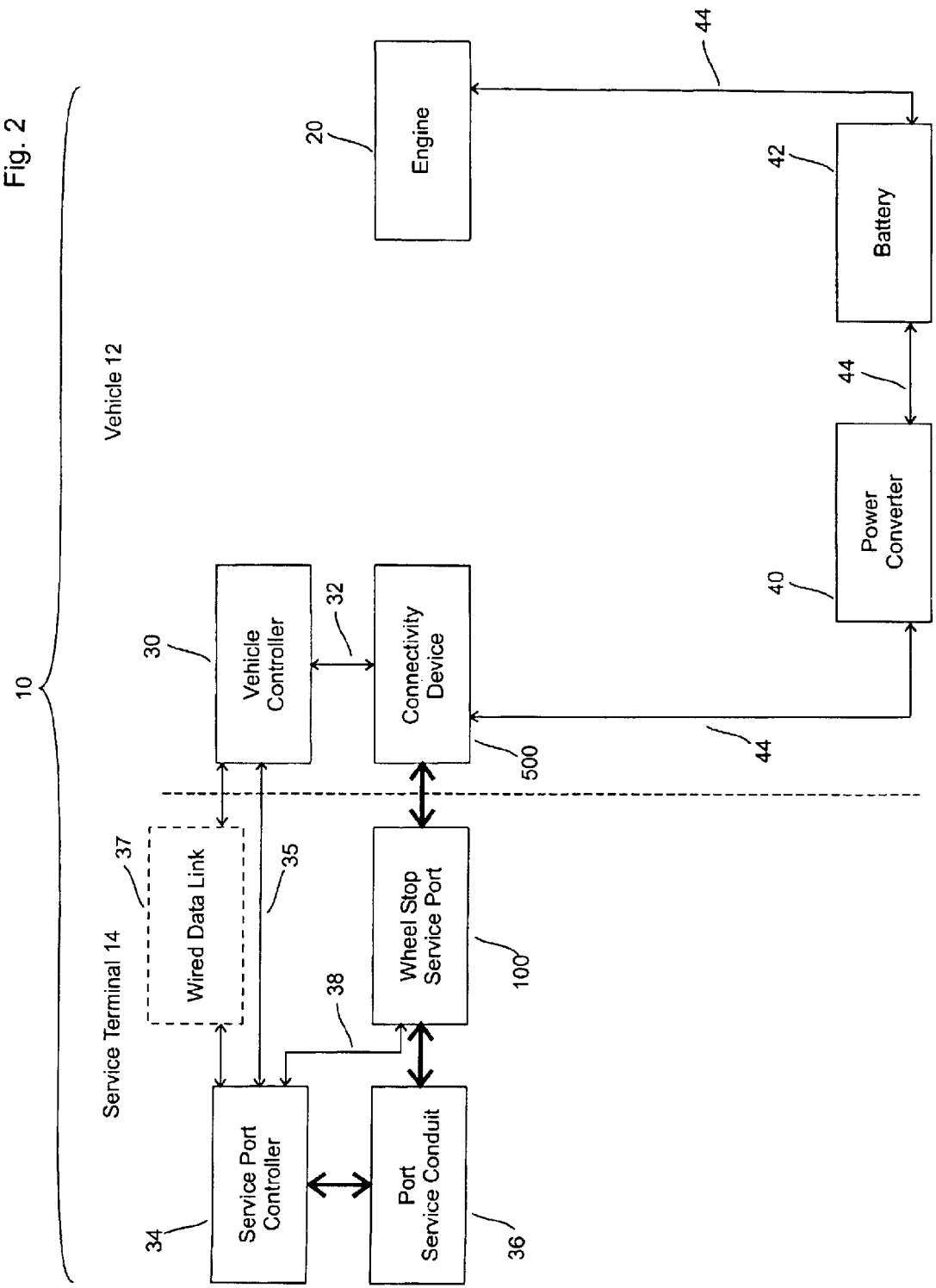
FIG. 2 is a system block diagram of a service terminal and a terminal-compatible vehicle, wherein electricity and data are exchangeable between the terminal and vehicle.

FIG. 2 illustrates a system 10 that transfers electrical energy between the vehicle 12 and the service terminal 14, wherein the vehicle 12 is a battery-powered electric vehicle (BPEV). The vehicle 12 therefore differs from the vehicle shown in FIG. 1 in that a power converter 40, battery 42 and electrical cables 44 replace the gas storage cylinder 22 and gas lines 24. Furthermore, the engine 20 is an electric motor, and the connectivity device 500 is configured to transmit electric power between the service terminal 14 and the vehicle 12, and the vehicle controller 30 is configured to control the transmission of electrical energy by the connectivity device 500. Electrical cables 44 electrically couple the connectivity device 500, power converter 40, battery 42, and the engine 20. Similarly, the service port 100 is configured to transmit electric power between the service terminal 14 and the vehicle 12, and the service port controller 34 is configured to control the transmission of energy by the service port 100.

Figure 3:
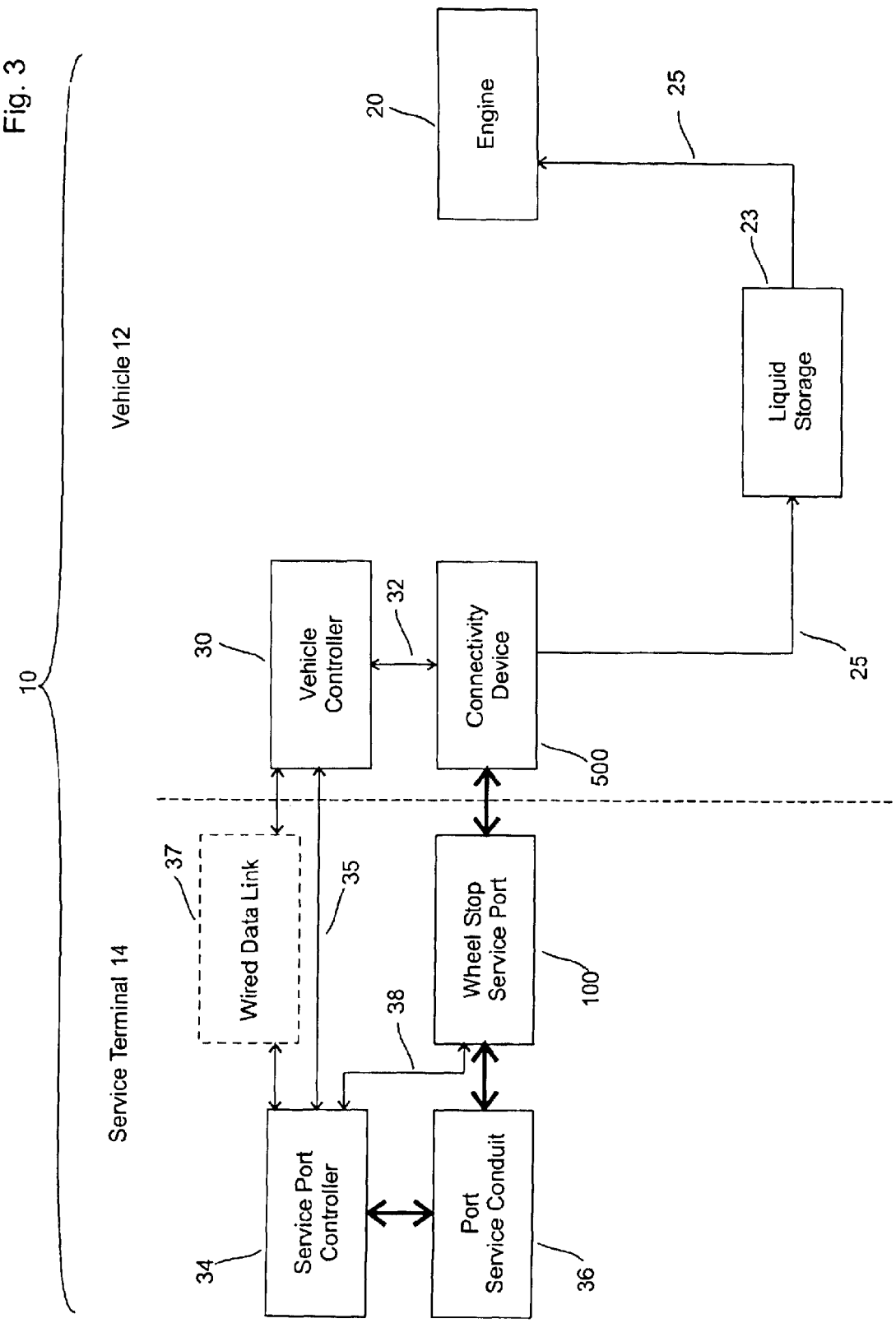
FIG. 3 is a system block diagram of a service terminal and a terminal-compatible vehicle, wherein liquid fuel and data are exchangeable between the terminal and vehicle.

FIG. 3 illustrates a system 10 that transfers liquid fuel between the service terminal 14 and the vehicle 12. The liquid fuel may be fuel that is directly combustible by a conventional internal combustion engine, or be reformed into hydrogen reformate for use by a fuel cell. The vehicle 12 therefore differs from the vehicle shown in FIG. 1 in that a liquid fuel storage tank 23 and liquid fuel lines 25 are designed to store and transmit liquid fuel as known in the art. Furthermore, the engine 20 is an internal combustion engine if the fuel is to be directly combusted, or a fuel cell if the fuel is reformate (in such case, a reformer (not shown) is provided to reform the fuel into hydrogen reformate and reaction products, and a scrubber is provided (not shown) to clean the fuel sufficiently for use by the fuel cell) and the connectivity device 500 is configured to transfer liquid fuel between the service terminal 14 and the vehicle 12, and the vehicle controller 30 is configured to control the transmission of liquid by the connectivity device 500. Similarly, the service port 100 is configured to transmit liquid fuel between the service terminal 14 and the vehicle 12, and the service port controller 34 is configured to control the transmission of liquid fuel by the service port 100.

Figure 4:
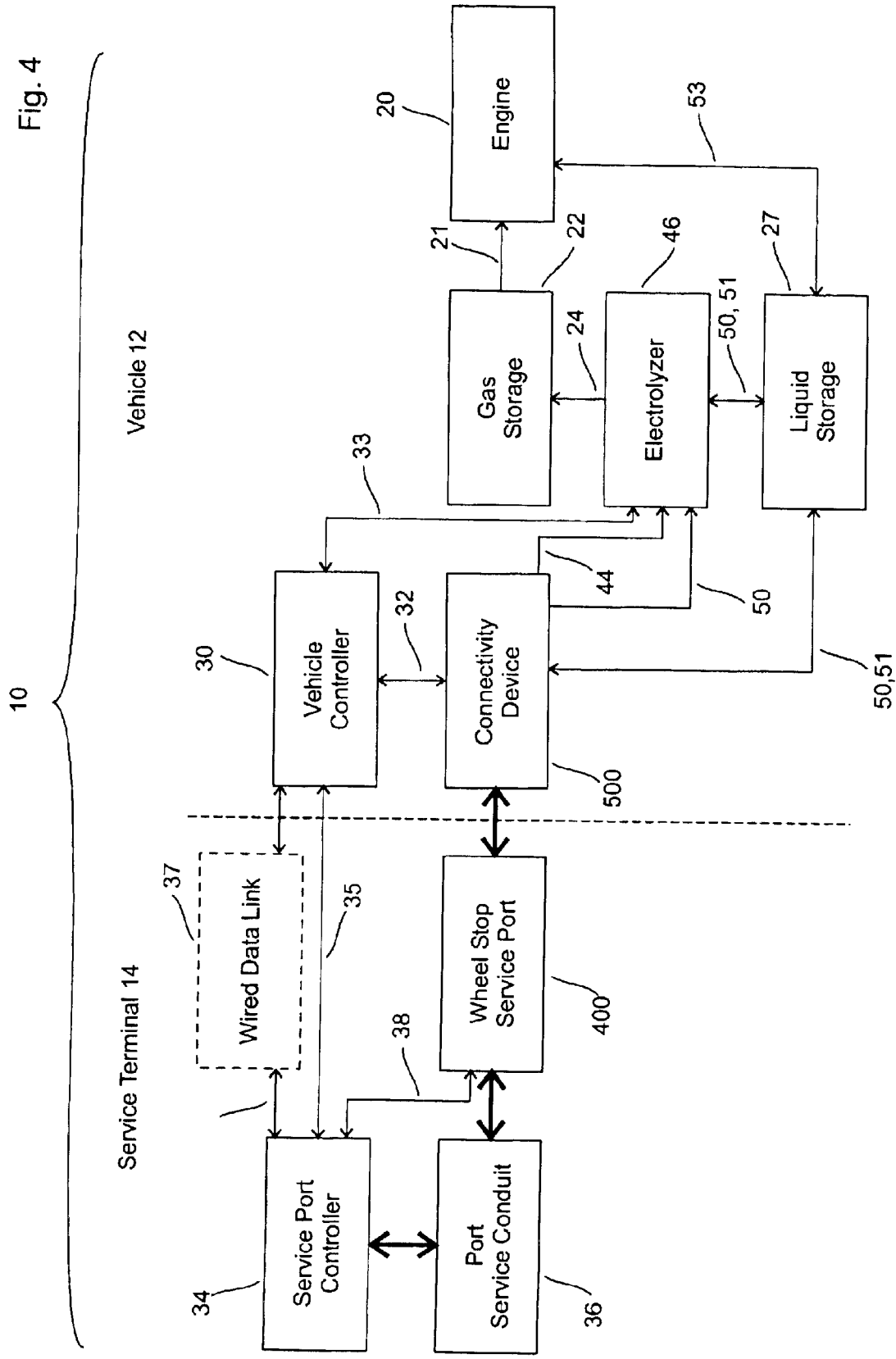
FIG. 4 is a system block diagram of a service terminal and a terminal-compatible vehicle, wherein water, electricity and data are exchangeable between the terminal and vehicle.

FIG. 4 illustrates a system 10 that transfers water and electrical energy between the service terminal 14 and the vehicle 12. The water is electrolyzed on-board the vehicle 12 to generate hydrogen fuel. The vehicle 12 therefore differs from the vehicle shown in FIG. 1 in that a liquid storage tank 27 is provided to store water transferred from the service terminal 14, an electrolyzer 46 is provided to electrolyze the water to produce hydrogen gas, and a gas storage cylinder 22 is provided to store the hydrogen gas for use by the engine 20. Hydrogen fuel lines 21 fluidly connect the gas storage cylinder 22 to the electrolyzer 46 and engine 20 respectively, and fluid supply and return lines 50, 51 fluidly connect the fluid storage tank 27 to the connectivity device 500 and the electrolyzer 46 respectively. Water is supplied to the vehicle 12 as hydrogen feedstock for the electrolyzer 46 via liquid supply line 50, and unused water from the electrolyzer 46 is returned through liquid return line 51. Water line 53 connects the liquid storage tank 27 to the engine 20 to return product water from the engine 20 and to supply water to humidify the gas stream. Both the connectivity device 500 and the service port 100 are configured to transfer liquid and electricity between the service terminal 14 and the vehicle 12. Electrical cables 44 electrically connect the connectivity device 500 to the electrolyzer 46. The vehicle controller 30 is configured to control the operation of the connectivity device 500 to transfer water and electricity for the operation of the electrolyzer 46. The vehicle controller 30 is electrically communicative with the connectivity device 500 via control signal wire 32 and with the electrolyzer 46 via electrical connector 33. The service port controller 34 is configured to control the operation of the service port 100 to transfer water and electricity. The service port controller 34 is electrically communicative with the service port 100 via the port service conduit 36. Optionally, the service port controller 34 may include control signal wires 38 connected directly to the service port 100 to provide liquid and electricity transfer control signals to control the transfer of liquids and electricity through the service port 100.

In operation, water is transferred to the vehicle 12 through the service port 100 and through the coupled connectivity device 500 and then stored in the liquid storage tank 27. The water is then transferred to the electrolyzer 46 and transformed to gaseous hydrogen by-product which is transferred to gas storage cylinders 22 through gas line 24. Electricity is transferred through the service port 100 and the connectivity device 500 and to the electrolyzer 46 to power the electrolysis process. Alternatively, water is transferred to the vehicle 12 through the service port 100 and through the coupled connectivity device 500 directly to the electrolyzer 46.

FIG. 5 illustrates a system 10 that is capable of transferring one or more of gaseous and liquid fuel, electrical energy and data between the service terminal 14 and the vehicle 12. The vehicle 12 may include some or all of the components as described in the systems illustrated in FIGS. 1 to 4. The connectivity device 500 may include one or a combination of the service connections as described in the previous systems. For this embodiment, the service port 100 has interfaces for at least gaseous fuel, liquid, electricity and data. The service port 100 is suitable to work with the connectivity device 500 of any of the vehicles described in FIGS. 1 to 4, regardless of the maximum number of service connections on the connectivity device 500. An additional function of the system 10 is that the type of connectivity device 500 and the type of service required is determined by communication between the vehicle controller 30 and the service port controller 34. The service port controller 34 provides control signals through the control signal wire 38 to the service port 100 directly, or via control signal wire 39 and port service conduit 36 to control the transfer of only those services suitable for the identified connectivity device 500.

Service Port

Figure 6A:
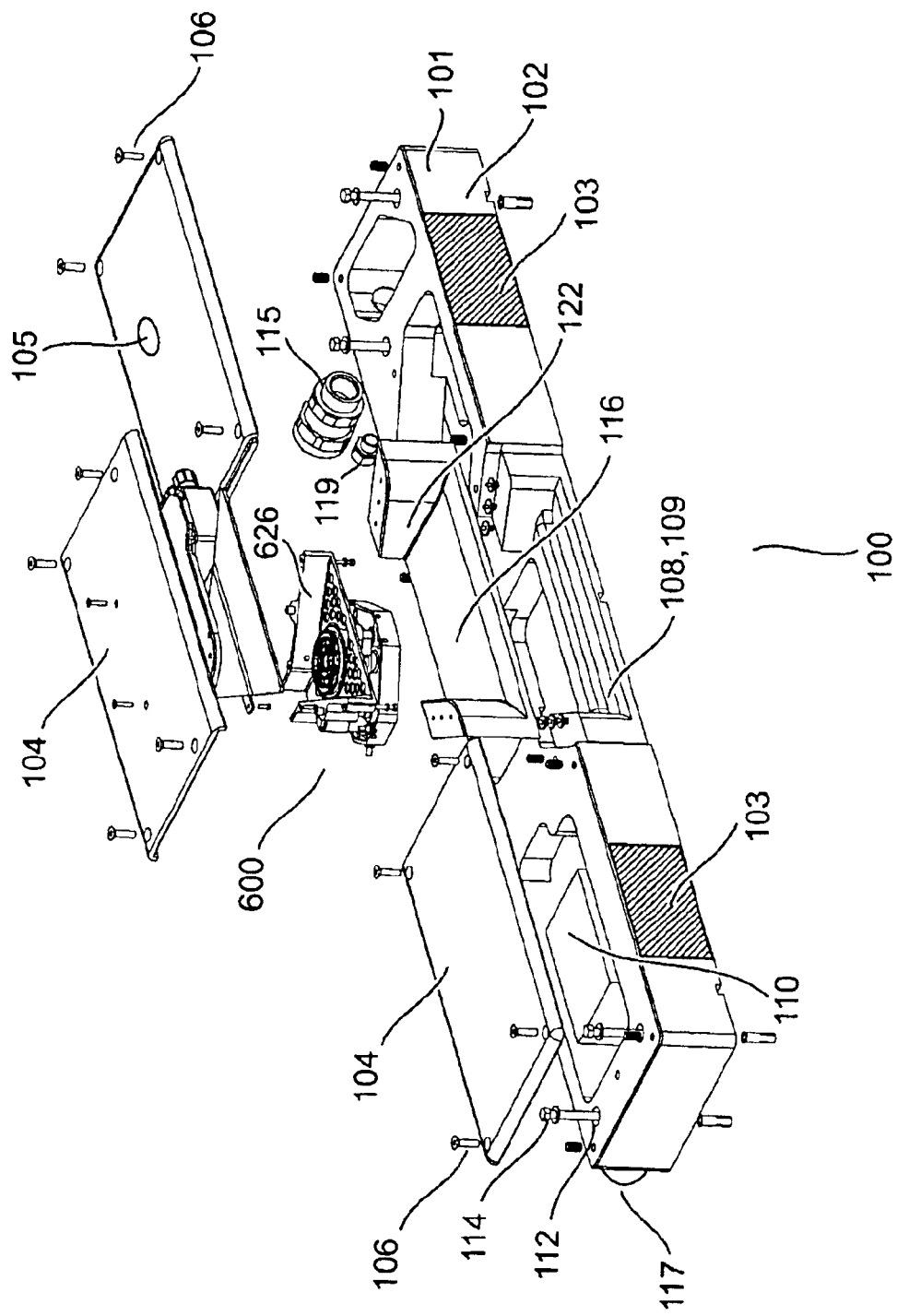

Referring to FIGS. 6(*a*) to (*c*), the service port 100 serves as a ground-mounted stationary docking location for vehicles 12 equipped with compatible connectivity devices 500. Such vehicles 12 couple to the service port 100 and bi-directionally transfer services between the service terminal 14 and the vehicle 12. As mentioned, these services include electrical power, gaseous or liquid fuels, water, or data. The service port 100 is also designed to serve as a wheel stop to prevent the wheels of the vehicle 12 from traveling beyond a specific point in a parking stall and to locate the vehicle 12 in a position that places the vehicle's connectivity device 500 in a position for coupling to the service port 100.

According to one embodiment of the invention, the service port 100 has a wheel stop housing 101 that includes a generally elongate rectangular housing body 102 and top cover panels 104. The top cover panels 104 are fastenable to the top of the housing body 102 by panel screws 106. Near the center of the front surface of the housing body 102 is an opening 108 that opens into a connection bay recess 109. Inside the housing body 102 is a cavity 110 that holds the service port controller 34 and its associated wireless transceiver (not shown). At the corners of the housing body 102, there are provided generally vertical fastening holes 112 for cooperating with fastening bolts 114 to fasten the service port 100 to the ground. At the back of the housing 101 are service conduit junctions 115, 117, 119 for coupling the port service conduits 36 to the service port 100; in particular, an AC power cable junction 115 and a DC signal junction 119 are provided at the right rear of the housing 101 for coupling to respective electrical power and signal conduits (not shown), and fluid conduit junction 117 is provided at the left rear of the housing 101 for coupling to respective fluid and hydrogen conduits (not shown).

It is to be understood that directional indicators such as "top", "front", "back", etc., are used in this specification as convenient reference terms indicative of the usual orientation of the service port 100 in operation, but are not to be construed to limit the operational orientation of the service port 100 in any way. In particular, the front of the service port 100 is defined to be the portion facing the vehicle 12.

The shape of the panels 104 in this embodiment is planar and the housing 101 has height and a width that enables a vehicle 12 to drive up to the service port 100 and have its front overhang (portion of the vehicle in front of the wheels) clear the top of the service port 100, and its two front tires abut against the front surface of the service port 100; contact with the service port 100 indicates to the driver that the vehicle 12 is in position for coupling. In case the driver miscalculates the vehicle's position relative to the service port 100, the planar top panels 104 enable the vehicle 12 to be driven over the service port 100 without the vehicle 12 or service port 100 suffering damage. While this embodiment illustrates an elongate rectangular box shaped housing 101, it is within the scope of the invention to provide different shapes for the housing 101, so long as the shape serves as a wheel stop for the vehicle 12, and is able to house the service port's coupling devices. For example, the service port 100 may comprise simply a pair of wheel contact surfaces 103 and a receptacle 600 for receiving a plug 500 from the vehicle 12, wherein the contact surfaces 103 are positioned relative to the receptacle 600 such that contact between the contact surfaces 103 and the vehicle 12 positions the vehicle 12 in place for service coupling. In such case, a pair of wheel contact surfaces 103 may be placed on either side of the receptacle 600 to correspond with the wheel track of the target vehicle(s) 12; or, a single wheel contact surface 103 may be used provided the contact with one of the front wheels of the vehicle locates the vehicle in a range for coupling.

The fastening holes 112 may be recessed and/or shouldered for easy flush mounting of the bolts within wheel stop housing 101. The wheel stop housing 101 is fixed in position suitably on a parking surface of a service terminal 14 at a location within a parking stall of the terminal 14, such as in the center of the parking stall. In a typical installation, the service port 100 would be mounted to a parking surface either inside or outside a building. It would typically be located near the end of a parking stall furthest from a driving or access lane, such that a driver can enter the parking stall in the front-end first (or nose-in) direction and stop with the vehicle nose near, over, or at the wheel stop. The service port 100 may be one of several service ports in a service terminal 14.

The port service conduits 36 include an AC power conduit connected to an AC power connector in the electrical conduit junction 115 and to the external power source/destination, a DC signal conduit connected to a signal connector in the electrical signal junction 119 and the service port controller 34, a fluid conduit connected to a fluid connector in the fluid conduit junction 117 and to the external fluid source/destination, and a hydrogen conduit connected to a hydrogen connector in the fluid conduit junction 117 and to the external hydrogen source/destination. The port service conduits 36 may be routed underground to avoid damage from the outside environment. Or, the port service conduits 36 may be housed in a single protective jacket and be embedded into the parking surface. Alternatively, the fluid conduits and electrical conduits may be housed in separate jackets.

A connection bay assembly comprising a connection bay 116 and the receptacle 600 is mounted in the connection bay recess 109 of the housing body 102. The connection bay 116 has a front opening in the shape of a rectangular slot, and has walls 122 that taper inwards both vertically and horizontally into the receptacle 600. The connection bay 116 is mounted in the recess 109 such that the front opening is flush with the opening 108. The receptacle 600 is mounted inside the recess 109 behind the connection bay 116 and also has tapered walls 626 that taper into the back wall of the receptacle 600. As will be discussed below, the tapered walls 122, 626 guide a service plug 700 from the vehicle's connectivity device 500 into a coupling position inside the receptacle 600, i.e. into a position where the plug 700 contacts the back wall of the receptacle 600.

The tapered walls 122, 626 act to guide, or "self locate" the plug 700 into a coupling position, thereby removing the need to provide costly electronic coupling guidance systems. It is understood that other self-locating designs such as a funnel may be substituted for the tapered walls 122, 626 as will occur to one skilled in the art.

An externally controlled receptacle 600 allows system intelligence such as the service port controller 34 to be located elsewhere and coupled to the service port 100 through the port service conduit 36, meaning that the service port 100 is a "dumb terminal" that can be economically and easily replaced. Optionally a port status indicator 105 is mounted in an optional port status indicator mount (not shown) and electrically coupled to the receptacle 600. Status control signals can be sent from the service port controller 34 through the receptacle 600 to the port status indicator, and may include a port failure status control signal. Or, the indicator 105 may be directly coupled to the controller 34 to receive status control signals.

Connectivity Device

Referring to FIG. 7, the connectivity device 500 is for connecting the vehicle 12 to the service terminal 14 such that services can be exchanged therebetween. In this first embodiment, the connectivity device 500 is mountable to the front underside of the vehicle 12, has a motorized mechanism to deploy the connectivity device 500 from the vehicle 12, and has a plug 700 to couple to the receptacle 600 on the service port 100 when the vehicle 12 is in close proximity to the service port 100. However, it is within the scope of the invention to locate the connectivity device 500 on the service port 100, and locate the receptacle 405 on the vehicle 12; in such case, the connectivity device 500 extends from the service port 100 to couple to the vehicle 12 when the vehicle 12 is in close proximity to the service port 100.

The major components of the connectivity device 500 are the plug 700 for coupling to the receptacle 600 of the service terminal 14, a compliant member 504 attached at one end to the plug 700, a deployment apparatus 510 attached to the compliant member 504 for deploying the plug 700 from a stored position into a deployed position and retracting same back into the stored position, and a vehicle mounting assembly 512 attached to the deployment apparatus 510 and couplable to the underside of the vehicle 12.

The compliant member 504 comprises a pair of flexible tubular fluid lines 514 and a flexible electrical cable 516 having a plurality of flexible electrical power conductors (not shown) housed within a protective jacket. The fluid lines 514 and the power conductors are coupled to components of the vehicle 12 that use or supply electricity and/or a liquid such as water. For example, the fluid lines 514 and electrical cables may be connected to the on-board electrolyzer 46 to supply feedstock fluid and power the electrolyzer 46, respectively.

Plug

The plug 700 is shown in detail in FIGS. 8 to 13. The plug 700 has a flattened rectangular box shape with its distal end resembling a half cylinder. The longitudinal and cylindrical edges of the plug 700 are beveled. As will be described in detail below, the cylindrical portion of the plug 700 provides a locating surface that enables the plug 700 to couple to the receptacle 600 at different angles and still enable the coupling to maintain a fluid and electrical connection. In this description, when the plug 700 is in a preferred orientation with the receptacle 600 it is referred to as being "perfectly aligned", and when the plug 700 is in another orientation that still maintains a fluid and electrical connection, it is referred to as being "operably aligned".

The plug 700 has a pair of service engagement portions, namely, a generally circular planar fluid exchange interface 702 at the distal end of its bottom face, and a generally circular planar electricity exchange interface 704 at the distal end of its top face. The plug fluid exchange interface 702 interacts with a corresponding fluid exchange interface 602 (shown in FIG. 14) of the receptacle 600 to transmit fluids between the vehicle and the service terminal 14. Similarly, the plug electricity exchange interface 704 interacts with a corresponding electricity exchange interface 604 (shown in FIG. 14) of the receptacle 600 to transmit electricity between the vehicle and the service terminal 14. The fluid and electricity exchange interfaces 702, 704 are located on opposite faces of the plug 700 to provide maximum physical separation between the transmitted fluids and electricity. Furthermore, the fluid exchange interface 702 is located on the bottom face of the plug 700 to prevent any fluids from spilling onto the electricity exchange interface 704.

Figure 8:
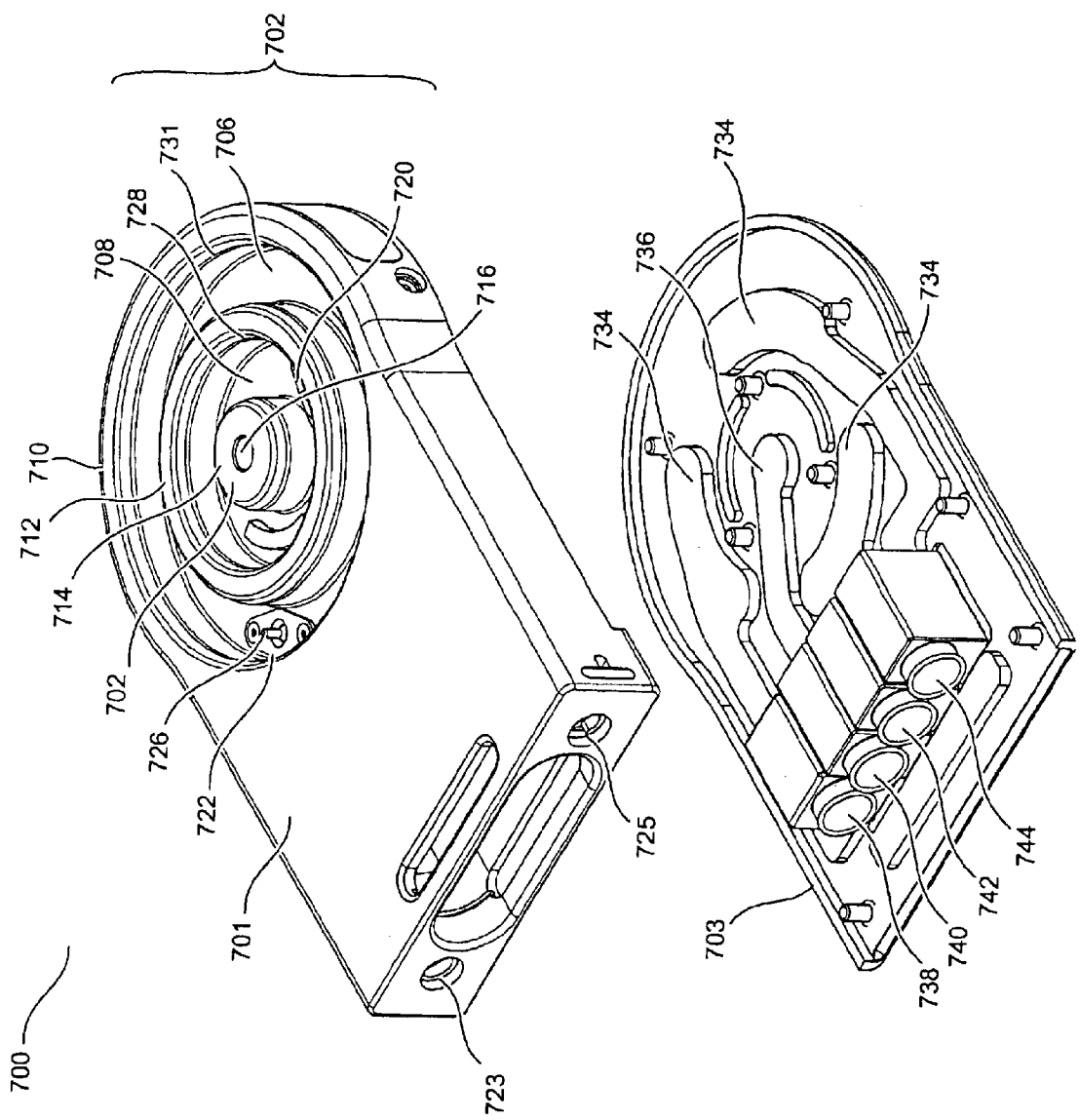
FIG. 8 is a perspective exploded view of a plug of the connectivity device.

Referring particularly to FIG. 8, the plug 700 has a shell comprising of two pieces of molded diallyl phythalate plastic, namely a fluid exchange interface shell 701 and an electricity exchange interface shell 703. Alternatively, the shell can be made of another type of thermoplastic or thermoset material such as polyetheretherketone. Referring particularly to FIGS. 8 to 10, the fluid exchange interface shell 701 is molded with outer and inner concentric annular open-faced fluid supply and drain channels 706, 708 and therebetween, outer, middle and inner concentric annular lands 710, 712, and 714, all centered around the center point of the fluid exchange interface 702 (which is the axis of the concentric channels and lands 706, 708, 710, 712, 714. The lands 710, 712, 714 are beveled to guide the plug 700 into alignment with the receptacle 600 when the plug 700 engages the receptacle 600 at an angle relative to the horizontal.

Located on the floor of the plug fluid drain channel 708 is a liquid drain port 720, and on the floor of the plug liquid supply channel 706 is a liquid supply port 722. The liquid drain port 720 is fluidly coupled to the liquid lines 514 of the connectivity device 500 via liquid drain lines 723 in the plug 700. The liquid supply port 722 is fluidly coupled to the liquid lines 514 via liquid supply lines 725 in the plug 700. The liquid drain and supply ports 720, 722 are biased closed by respective spring-loaded/poppet valve assemblies 724, 726. When the plug 700 is not coupled to the receptacle 600, the valves 724, 726 are in their extended position, thereby completing a seal; when plug 700 is coupled to the receptacle 600, the springs are compressed, thereby opening a passage for fluid to flow through the valves 724, 726. Most of the valve assembly of both valves 724, 726 are recessed in the surface of the liquid drain channel floor to reduce the likelihood of contaminants contacting the valves' external surfaces. Rubber O-rings 728, 731 are attached to the channel walls of the inner and outer fluid channels 708, 706 to provide a fluid seal when the liquid drain and supply ports 720, 722 engage corresponding liquid supply and drain ports of the receptacle 600.

Referring to FIGS. 8 and 11, the electricity exchange interface shell 703 is molded to provide three open-faced electrical bus bar contacts 734 and an open-faced ground bus bar contact channel 736. The electrical bus bar contacts 734 extend between arcuate openings in the electricity exchange interface 704 to electrical contact ports 738, 742, 744 at the proximal end of the plug 700. The arcuate openings resemble three segments of a circular arc contact centered about the electricity exchange interface 704, wherein each segment has an arc length of about 90 degrees, and is separated from each other by about 30 degrees. The ground bus bar contact 736 extends from a circular opening in the center of the electricity exchange interface 704 to ground contact port 740 at the proximal end of the plug 700. Seated in the electrical bus bar contacts 734 are electrical contacts 730 that have an arcuate engagement portion that extends into the arcuate openings and an end portion that extends into the electrical contact ports 738, 742, 744. These electrical contact ports 738, 742, 744 in turn are connected to electrical cables in the connectivity device 500 which are connected to electrical components on the vehicle 12. Electricity is transmittable between the vehicle 12 and service terminal 14 when the plug 700 is plugged into the receptacle 600 and the electrical contacts 730 contact corresponding electrical contacts 630 of the receptacle 600. Each contact 730 transmits current of a different phase, such that collectively, the contacts 730 enable the transmission of three-phase AC current. A ground contact 732 is seated in the ground bus bar contact 736 and extends into the circular opening, as well as to ground contact port 740; the ground bus bar contact 736 contacts a corresponding receptacle ground contact 632 when the plug 700 is plugged into the receptacle 600.

When the plug 700 is perfectly aligned with the receptacle 600, the receptacle electrical contacts 630 (which are butt-type contacts) contact the mid-point of the plug electrical contacts 730; the 90 degree arcuate nature of the contacts 730 enables the plug 700 to have an operable alignment of +/−45 degrees, i.e. maintain a service connection even when the plug 700 is aligned +/−45 degrees from the perfect alignment.

Alternatively, the three contacts 730 can be replaced by a single contact if only one-phase power is desired; in such case, the contact can be a single annular ring. Similarly, the circular fluid channels may instead be one or more arcuate channels centered about the fluid exchange interface 602 center point.

According to another alternative embodiment of the invention, the arcuate contacts may be arranged concentrically around a common arc-axis (not shown). One or a group of contacts has a common radius, and the electrical exchange interface may have a plurality of such groups, each having a different radius.

Receptacle

Referring to FIGS. 14 to 17, the major components of the receptacle 600 are a service engagement portion comprising the fluid exchange interface 602 and the electricity exchange interface 604, a protective cover 646, a plug clamping assembly 607, and a cover drive assembly 609.

Figure 16:
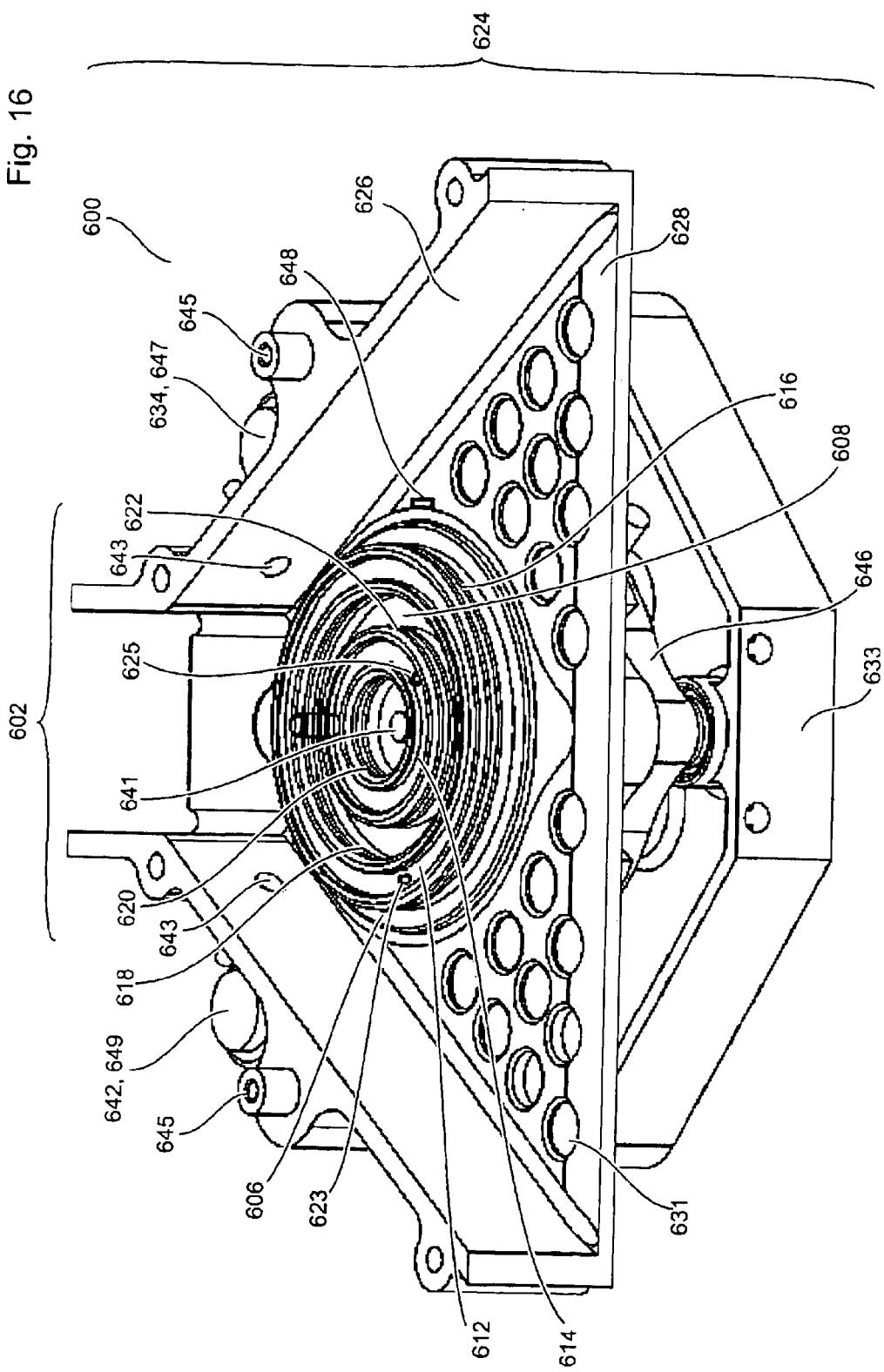
FIG. 16 is a perspective view of a lower assembly of a receptacle of the service port.
Figure 17:
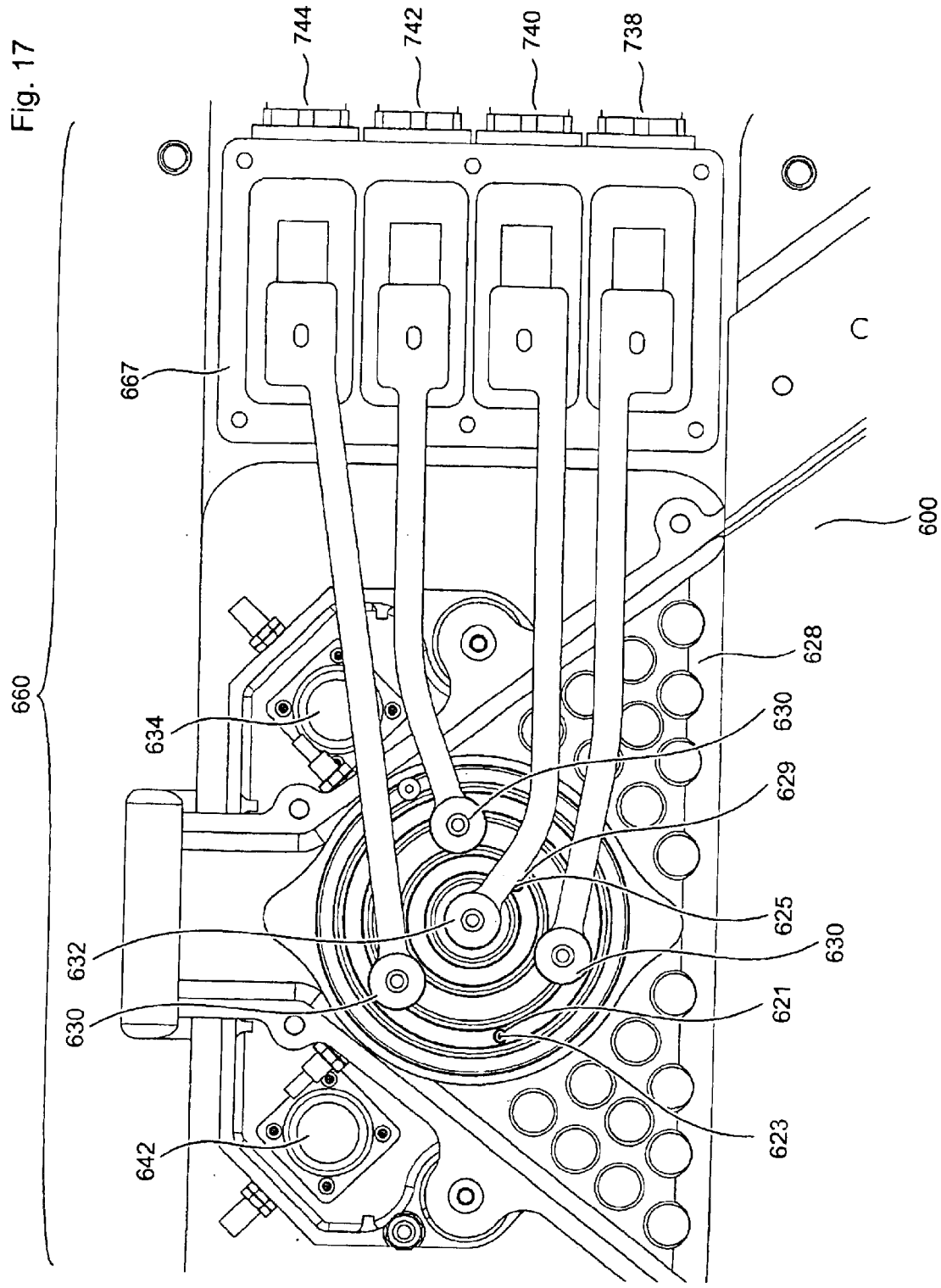
FIG. 17 is a top plan view of portions of the receptacle, including the electrical exchange interface.

Referring particularly to FIGS. 16 and 17, the receptacle fluid exchange interface 602 has a topography that corresponds to the topography of the plug fluid exchange interface 702. That is, the receptacle fluid exchange interface 602 has receptacle fluid supply and drain lands 612, 614 that mate with respective plug fluid supply and drain channels 706, 708, and receptacle channels 606, 608 that mate with plug lands 710, 712, 714 of the plug 700. The receptacle fluid supply land 612 is provided with inner and outer O-rings 616, 618 and receptacle fluid drain land 614 is provided with inner and outer O-rings 620, 622 to provide a fluid seal when the plug fluid exchange interface 702 and the receptacle fluid exchange interface 602 are engaged. The receptacle fluid supply land 612 has a fluid supply port 623 biased closed by a poppet valve assembly (not shown), and the receptacle fluid drain land 614 has a fluid drain port 625 also biased closed by a poppet valve assembly (not shown). The fluid transferred through the fluid supply and drain ports 623, 625 may be liquid water, or gaseous hydrogen. It will readily occur to one skilled in the art to adapt the respective fluid transfer components to handle the transfer of the particular fluid being transferred.

The receptacle fluid exchange interface 602 is part of a larger receptacle lower assembly 624. The lower assembly 624 also includes tapered walls 626, and a dimpled floor 628. The tapering of the walls 626 guide the plug 700 into place, i.e. so that the plug fluid and electricity exchange interfaces 702, 704 overlap with the receptacle fluid and electricity exchange interfaces 602, 604. Dimples 631 in the floor 628 collect unwanted foreign matter. Underneath the floor 628 is a receptacle drive case 632 that holds plug clamping assembly 607 and the cover drive assembly 609.

The plug clamping assembly 607 includes a clamp actuation motor 634 (seen in FIG. 16), a drive belt 636 connected to the motor 634, a sprocket assembly 638 connected to the drive belt 636, and a clamp activation screw 640 connected to the sprocket assembly 638. The receptacle fluid exchange interface 602 is vertically movably mounted to the receptacle lower assembly 624, and is vertically movable by the clamp activation screw 640 connected to the bottom of the fluid exchange interface 602. A proximity sensor 641 is provided to detect when the receptacle fluid exchange interface 602 has contacted the plug fluid exchange interface 702 ("plug engaged" proximity sensor 641). The plug engaged proximity sensor 641 is seated in the center of the receptacle fluid exchange interface 602. This sensor 641 may be for example, an OMRON 8 mm barrel inductive proximity sensor (OMRON E2F-X1R5E1).

A proximity sensor, or a pair of proximity sensors ("left plug docked" and "right plug docked" proximity sensors) 643 are installed into the side wall at the back of the receptacle to detect when the plug 700 is in place for coupling inside the receptacle. The sensor 643 may be for example, OMRON 8 mm barrel inductive proximity sensors (OMRON E2F-X1R5E1).

The clamping force of the receptacle fluid exchange interface 602 against the plug fluid exchange interface 702 is monitored by a "clamping force" proximity sensor 645 such as an OMRON 8 mm barrel inductive proximity sensor (OMRON E2F-X1R5E1). As can be seen in FIG. 16, the clamping force proximity sensor 645 is located at the point where the lower portion of the receptacle joins the upper portion of the receptacle. Force exerted by the receptacle fluid exchange interface 602 against the plug fluid exchange interface 702 causes an equal and opposite force against the upper and lower portions of the receptacle; this force is measured by the clamping force proximity sensor 645.

The operation of the clamp actuation motor 634 may also be monitored by a receptacle motor current sensor 647 such as a CUI Stack Inc. SCD5PSR. This current measured by this sensor 647 is a function of the resistance encountered by the clamp actuation motor 634; the measured current spikes when the plug and receptacle fluid exchange interfaces engage, and continues to increase as the clamping force increases.

Figure 14:
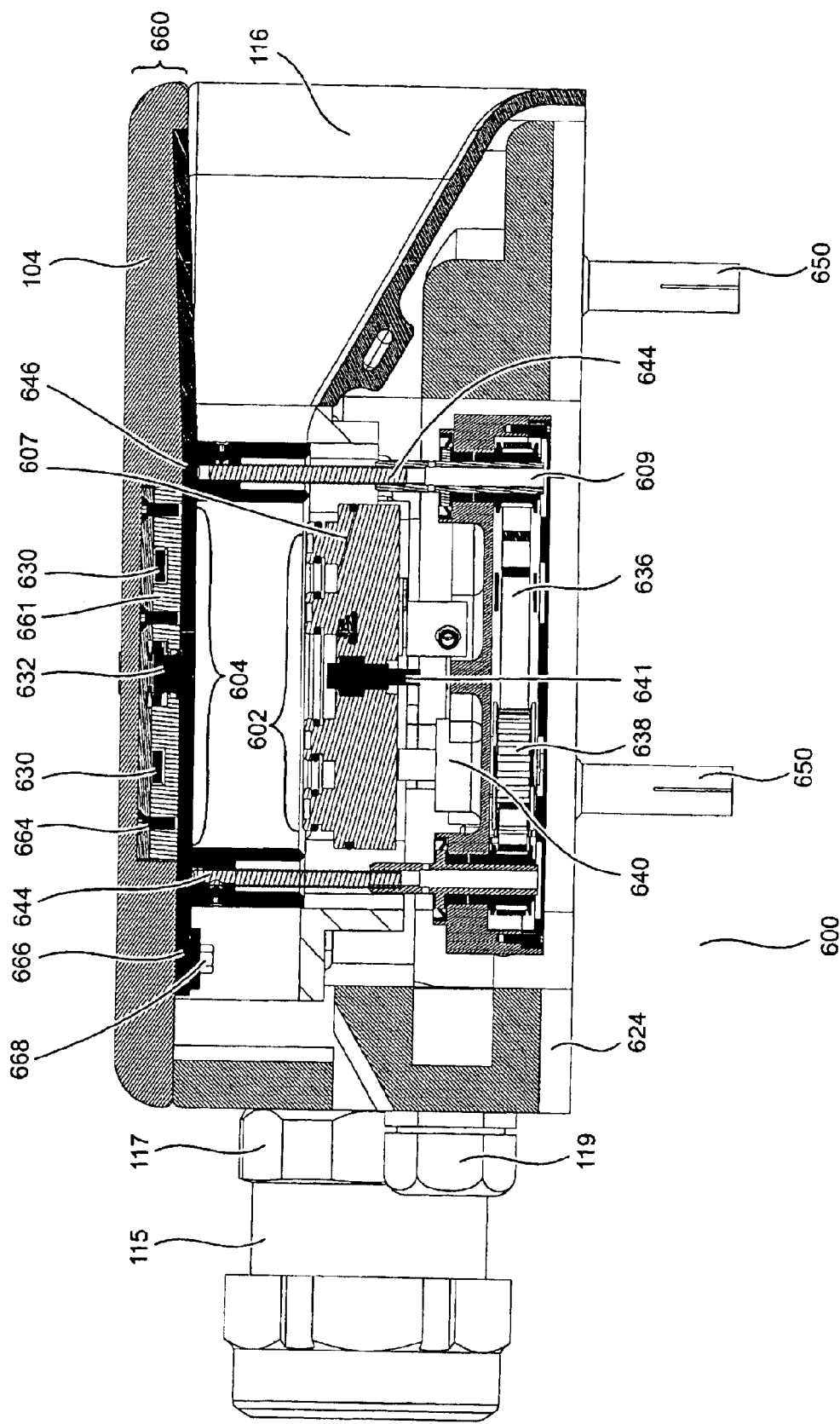
FIG. 14 is a side elevation view of the service port in an uncoupled state.
Figure 15:
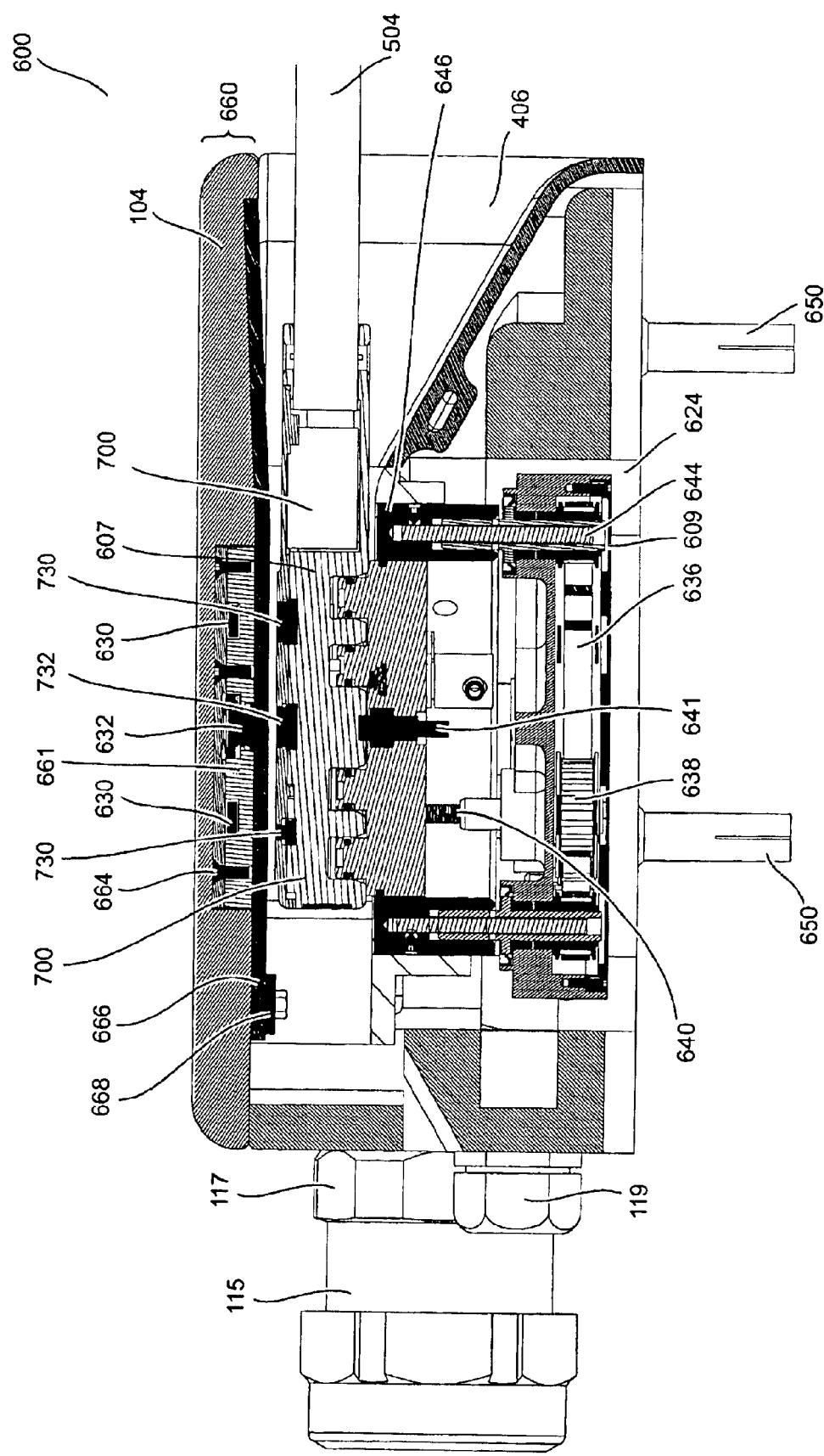
FIG. 15 is a side elevation view of the service port coupled with the connectivity device.

Referring particularly to FIGS. 14 to 16 the cover drive assembly 609 includes a cover actuation motor 642, a drive belt (not shown) connected to the motor 642, a cover sprocket assembly (not shown) connected to the belt, and a cover activation screw 644 connected to the sprocket assembly. The cover activation screw 644 is connected to the annular cover 646 which surrounds the outer periphery of the receptacle fluid exchange interface. The cover 646 is vertically movably mounted to the lower assembly 624; as can be seen in FIGS. 14 and 15, the cover actuation motor 642 can be activated to raise and lower the cover 646. The cover 646 is raised when the receptacle 600 is empty, and lowered to allow the plug 700 to enter into the receptacle 600. A proximity sensor 648 is provided to detect when the cover is fully retracted ("cover down" sensor); this sensor 648 is mounted to the dimpled floor in the vicinity of the cover 646. This sensor 648 may be for example an OMRON E2F-XR5E1. One or more of the plug docked proximity sensors 643 are used to determine whether the cover is fully raised; for example, the sensor 643 can be a barrel inductive proximity sensor that detects a ferrous strip located on the cover 646 in a position that is detectable by the sensor 643 when the cover is fully raised. The cover actuation motor 642 is connected to a current sensor 649 ("cover motor current" sensor), such as a CUI Stack Inc. SCD5PSR, to measure the current of the motor 642 to determine when the cover 646 is in a fully raised position (and contacting the receptacle ceiling).

The service port 100 is provided with housing anchor nuts 650 that attach the service port 100 to a parking surface, an AC power cable junction 115 extending out of the back of the service port 100 and housing AC power connectors (not shown), a DC signal junction 119 also extending out of the back of the service port 100 and housing a DC signal connectors, and a fluid conduit junction 119 extending out of the back of the service port 100 and housing water and hydrogen gas conduit connectors (not shown). The respective connectors are coupled to the receptacle, to enable the flow of electricity, water and hydrogen therebetween.

Referring particularly to FIGS. 15 and 17, the receptacle electricity exchange interface 604 has a circular shape that corresponds to the plug electricity exchange interface 704. The surface of the electricity exchange interface 604 has three contact openings (not shown) equidistant from the center of the electricity exchange interface 604 and a ground opening (not shown) at the center of the electricity exchange interface 604. Each electrical contact 630 is a butt-type contact having an engagement end that extends through each contact opening, and is also coupled to electrical connectors (not shown) in the service port 100 that in turn are coupled to an external electrical source and/or user, e.g. an electrical grid. The engagement end has a diameter that does not exceed the width of the arcuate electrical contacts 730 of the plug 700; this enables electrical contact to be maintained between the plug and receptacle contacts 730, 630 when the plug 700 is rotated about the axis of the arcuate plug contacts 730 and within the arc-length of the plug contacts 730. Similarly, a ground contact 632 has a butt engagement end that extends through the ground opening (not shown) and a body that is coupled to a grounded electrical connector (not shown). The electrical and ground contacts 630, 632 are sprung by a disk spring (not shown) that biases the contacts 630, 632 through the openings to enhance the contact between the receptacle contacts 630, 632 and the plug contacts 730, 732 when the plug 700 is plugged into the receptacle 600. Alternatively, the spring may be a conical washer or Belleville washer. The receptacle electrical and ground contacts 230, 232 may be made from a long strip of copper bus bar that is free to move in the upper receptacle assembly to provide sufficient flexibility to allow the receptacle contacts 730, 732 to move upon contact with the plug contacts (not shown).

Referring again to FIGS. 14 and 15, the receptacle upper assembly includes a receptacle upper assembly frame 661, the receptacle electricity exchange interface 604 attached to the bottom face of the frame 661 by mounting screws 664, an elastomeric contact seal 666 mounted to the frame 661 by mounting bolts 668, electrical junction box 667 physically attached to the frame 661 and electrically connected to the electrical contacts, and means to attach the frame 661 to the lower assembly 624, e.g. screws. The upper assembly is covered by a top panel 104 of the wheel stop housing. The elastomeric seal 666 is biased downwards and provides protection to the electrical and ground contacts 730, 732 when the receptacle 600 is uncoupled. The junction box 667 is also provided with electrical contact ports 738, 742, 744 that connect the electrical contacts 730 to the service conduit 36, and with ground contact port 740 that connects the ground contact 732 to the service conduit 36. The elastomer seal 666 may have a dimpled exterior surface pattern; under compression, this surface pattern may cause environmental water and other liquids to accumulate within the dimples, thereby leaving the raised surface portions dry. As such, safety may be enhanced by keeping the electrical contacts dry.

Service Port Controller

Figure 18:
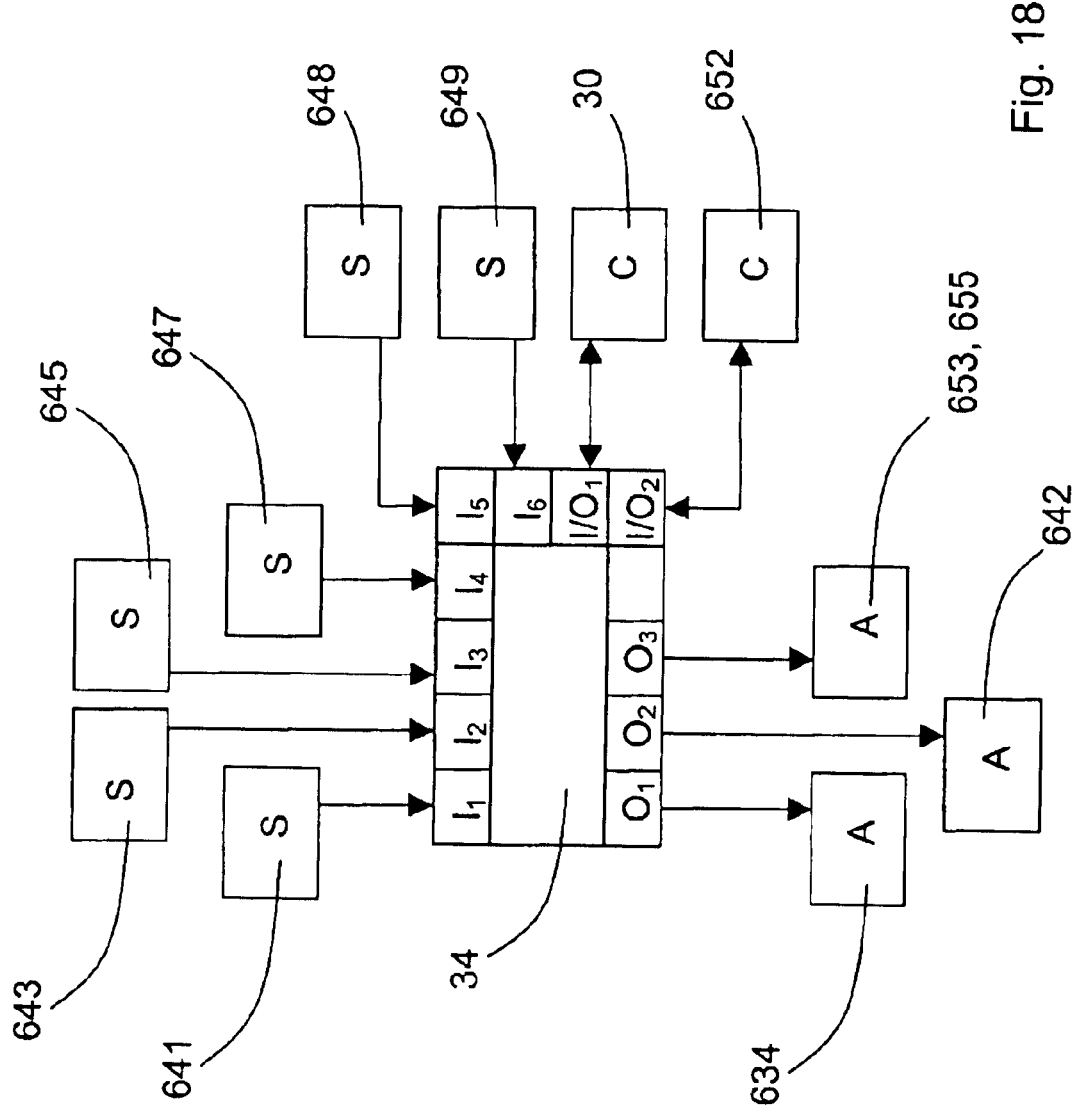
FIG. 18 is a system schematic of the electrical connections between sensors, actuators, and a service port controller of the service port.

Referring now to FIG. 18, the service port controller 34 is electrically communicative with the sensors 641, 643, 645, 647, 648, 649, motors 634, 642, and optionally, the fluid valve assemblies inside the receptacle 600, and serves to control an automated engagement of the respective plug and receptacle service exchange interfaces 602, 702, 604, 704 and the transfer of services therebetween.

The service port controller 34 is electrically wired to each sensor 641, 643, 645, 647, 648, 649 to receive data signals from and send electrical power to the sensor. The service port controller 34 is also electrically wired to the cover and clamp actuation motors 642, 634 to send power and control signals to the motors. The service port controller 34 is also electrically wired to a radio frequency (RF) transceiver 652 that is wirelessly communicative with a compatible RF transceiver (not shown) on board a docking vehicle 12. The service port controller 34 is also optionally electrically wired to valve solenoids in the poppet valve assemblies of the receptacle fluid supply and drain ports 623, 625 to send power and control signals to the solenoids. The service port controller 34 is also electrically wired to a station controller 651 located at a fuel dispensing location, e.g. a fueling station having hydrogen tanks and/or water storage tanks that are fluidly connected via respective fluid conduits to the service port 100, to send and receive signals from the station controller.

The service port controller 34 is programmed to automatically engage the receptacle and plug service exchange interfaces 602, 604, 702, 704 when the plug 700 is properly inserted into the receptacle 600, and to initiate a service exchange between a coupled vehicle 12 and the service port 100 when conditions are appropriate for a service exchange. The programming of the service port controller 34 will be readily apparent to a person skilled in the art given the system schematic in FIG. 18, the operational flow chart in FIG. 19 and the following description of the events associated with an exchange interface engagement and a service exchange.

Coupling the Plug with the Receptacle

Figure 19:
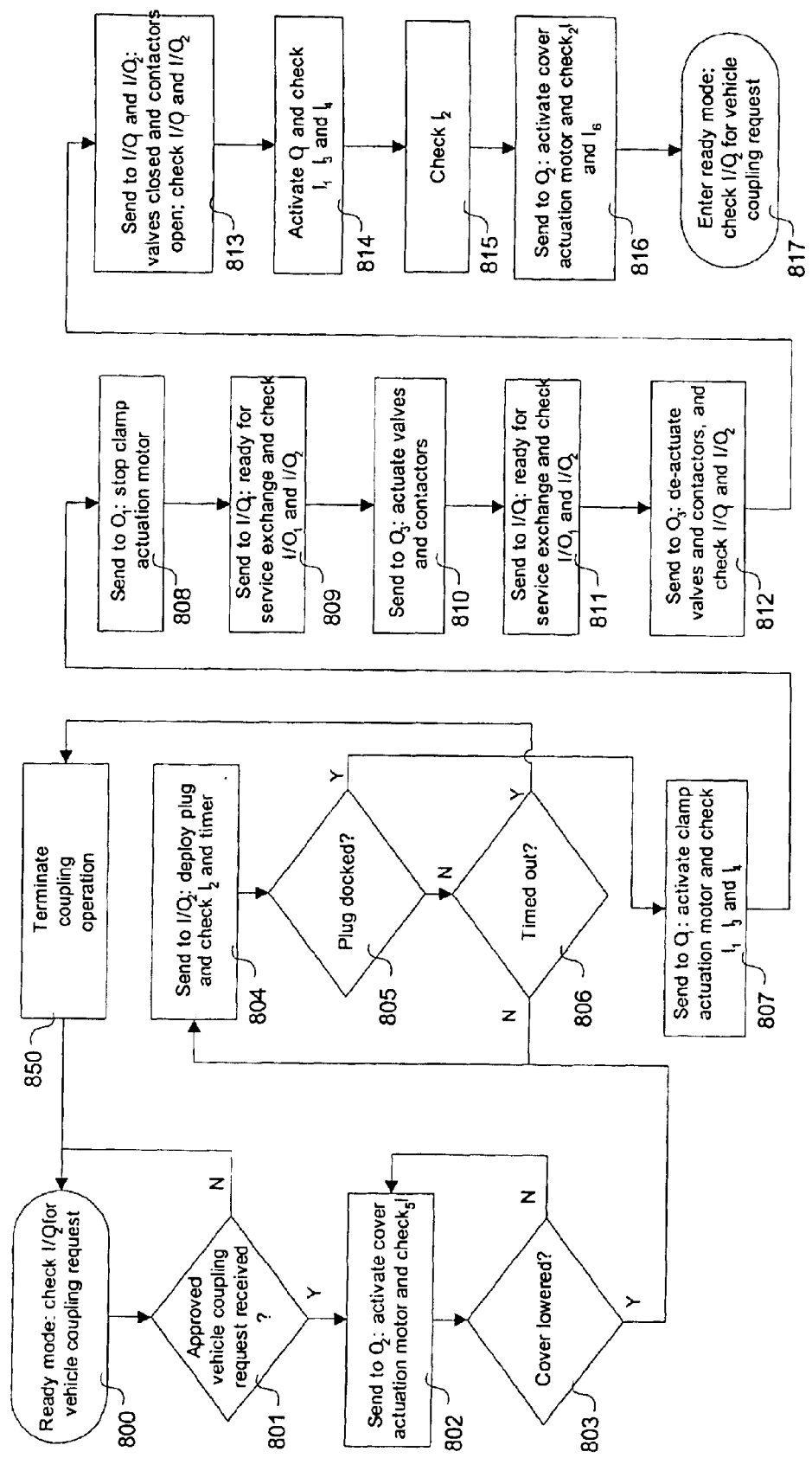
FIG. 19 is a flowchart of the operation of the service port controller in effecting an automated coupling of the plug and receptacle.

Referring now to FIGS. 18 and 19, the service port controller 34 is programmed to enter into a "ready mode" indicating that the service port 100 is ready to receive a vehicle 100 as represented by a process block 800. Such ready mode is entered only when the cover 646 is in a fully raised position, the receptacle fluid exchange interface 602 is in a fully lowered position, the motors 634, 642 are dormant, and the valves in the valve assemblies are closed. The service port controller 34 performs a periodic system check to determine whether ready mode is to be maintained by sampling data signals from each of the sensors 641, 643, 645, 647, 648, 649 and confirming that the plug engaged proximity sensor 641 indicates that no plug is engaged, the plug docked sensors 643 indicate that no plug is docked in the receptacle 600 and that the cover 646 is raised, the clamping force proximity sensor 645 indicates that no clamping force has been applied, the plug and cover actuation motor current sensors 647, 649 indicate that the plug and cover actuation motors 634, 642 are not operating, and that the cover down proximity sensor 648 indicates that the cover 646 is not lowered. When any of the sensors 641, 643, 645, 647, 648, 649 do not return such a signal, then the service port controller 34 is programmed to enter into fault mode.

When a vehicle 12 drives into coupling position with the service port 100, the vehicle requests the service port 100 to approve a service exchange via the respective RF transceivers as represented by a decision block 801. When the service port controller 34 has approved the vehicle's request, the service port controller 34 is programmed to send a control signal to the cover actuation motor 642 to lower the protective cover 646 and monitor the data signals from the cover down proximity sensor 648 as represented by a process block 802. The service port controller 34 continues to operate the cover actuation motor 642 until the service port controller 34 detects a data signal from the cover down proximity sensor 648 indicating that the cover has completely lowered as represented by a decision block 803 and the process block 802. When such signal is received, the service port controller 34 signals the vehicle controller 30 to initiate plug deployment as represented by a process block 804.

The service port controller 34 is programmed to then monitor the data signals from the left and right plug docked sensors 643 until at least one plug docked sensor 643 indicates that the plug 700 has docked as represented by process block 804 and decision block 805; the sensors 643 are strategically located in a position in the receptacle 600 such that when the plug 700 contacts at least one sensor 643, the plug 700 is in a proper position for the respective plug and receptacle service exchange interfaces 602, 604, 702, 704 to engage. The service port controller 34 may be programmed to send a signal to the vehicle controller 30 if the plug 700 has not reached the proper engagement position after a selected time after the cover 646 has been lowered, advising that the docking is incomplete as represented by a decision block 806. The service port controller 34 may be programmed to then retract the plug 700, raise the cover 646 and terminate the coupling transaction as represented by a process block 850.

Once the plug 700 is in an engagement position, the service port controller 34 is programmed to send a control signal to actuate the clamp actuation motor 634 and monitor the data signals from the plug engaged proximity sensor 641, the clamping force proximity sensor 645, and the plug actuation motor current sensor 647 as represented by a process block 807. The service port controller 34 continues to operate the clamp actuation motor 634 when all sensors return a signal below a threshold value. When, however, the proximity sensor 641 indicates that the plug and receptacle interfaces 602, 604, 702, 704 have engaged, and the clamping force proximity sensors 645 and actuation motor current sensor 647 indicate that a threshold clamping force has been established, the service port controller 34 stops the operation of the clamp actuation motor 634 as represented by a process block 808. The service port controller 34 also stops clamping when one or both of the clamping force proximity sensor 645 and the current sensor 647 return a signal that exceeds a predetermined force threshold as represented by a process block 809; if such threshold has been exceeded and the plug engaged proximity sensor 641 has not sent a "plug engaged" data signal, the service port controller 34 stops motor actuation, and registers that there is some kind of physical interference is preventing the plug and receptacle service exchange interfaces 602, 604, 702, 704 from engaging (e.g. debris blockage). The service port controller 34 may be programmed to retract the receptacle service exchange interface 602 and transmit a signal to the vehicle controller 30 advising of the blockage and requesting a reinsertion of the plug 700, or termination of the coupling transaction.

Once the plug 700 and receptacle 600 have fully engaged, the service port controller 34 may optionally be programmed to send a control signal to the valve assemblies of the receptacle supply and drain ports 623, 625 as represented by a process block 810; in particular, the control signals are sent to valve solenoids 653 to cause the valves in each port 623, 625 to open. Similarly the service port controller 34 may be programmed to send control signals to electrical switches 655 to actuate electrical circuit contactors. Alternatively, the valves of the ports 623, 625 may be biased closed by springs, and be displaced open upon physical contact with surfaces on the plug 700. Once the valves have opened, the service port controller 34 sends a signal to the vehicle controller 30 advising that the plug 700 and receptacle 600 have engaged, and that the service port 100 is ready for a service exchange, and then queries the vehicle controller 30 to confirm that the vehicle 12 is also ready for a service exchange. Once the service port controller 34 has received a positive response from the vehicle controller 30, the service port controller 34 sends a signal to the station controller 651 advising that both the vehicle 12 and service port 100 are ready to transfer services. When the station controller 651 has approved services to be exchanged, fluids such as gaseous hydrogen and water, and electricity may be transmitted from the station to the vehicle 12 through the receptacle/plug coupling, or vice versa as represented by a process block 811.

Service exchange continues until one or both of the station controller 651 and vehicle controller 30 sends a signal to the service port controller 34. Once such stop signal has been received, the service port controller 34 is programmed to send a control signal to the valve assemblies 653 to close the valves of the fluid supply and drain ports 623, 635, and send control signals to electrical switches 655 to de-actuate electrical circuit contactors (not shown), and send a control signal to the clamp actuation motor 634 to lower the receptacle fluid exchange interface 602 as represented by process blocks 812 and 813. The clamp actuation motor 634 is operated until the service port controller 34 receives a signal from the plug engaged proximity sensor 641, the clamping force proximity sensor 645, and the motor current sensor 647 that the plug and receptacle have disengaged, and the receptacle fluid exchange interface 602 has been lowered completely as represented by a process block 814. Then, the service port controller 34 is programmed to send a signal to the vehicle controller 30 advising that the plug has been uncoupled, and for the vehicle 12 to withdraw the plug 700 from the receptacle 600 as represented by a process block 815. The service port controller 34 is then programmed to monitor the left and right plug docked sensors 643 and wait a selected period of time. After the sensors 643 indicate that the plug has left contact and the period of time has elapsed, the service port controller 34 is programmed to send a control signal to the cover motor 642 to raise the cover 646 as represented by a process block 816. The service port controller 34 is programmed to monitor data signals from the cover motor current sensor 649 and the cover down proximity sensor 648, and continues to operate the cover motor 642 until both the proximity sensor 648 detects that the cover is up and the current sensor 649 detects a spike in the current draw (indicating that the motor has encountered resistance). When this condition is met, the service port controller 34 registers that the receptacle 600 has been returned to a ready state and is ready to perform another coupling transaction as represented by a terminal block 817.

If however the current sensor 649 sends a current spike signal to the controller 34 without the service port controller 34 receiving a positive signal from the proximity sensor 648, the service port controller 34 is programmed to stop the raising of the cover 646, and register that something is interfering with the raising of the cover 646. The service port controller 34 may be programmed to send a signal to the vehicle controller 30 querying whether the plug 700 is still partially inserted into the receptacle 600, or send a malfunction signal to the station controller 651.

Alternative Coupling Configurations

The embodiments described so far relate to a system wherein the connectivity device 500 is mounted under the front part of the vehicle 12, and the service port 100 is in a wheel stop housing. Alternative embodiments of the invention are illustrated in FIGS. 21 to 25 wherein the service port 100 is located on a different part of the service terminal 14, and the connectivity device 500 is located on a different part of the vehicle 12. Further alternative embodiments of the invention are illustrated in FIGS. 26 to 31 wherein the connectivity device 500 is located at various locations on the service terminal 14 and the service port 100 is located at various locations on the vehicle 12; in such case, the connectivity device 500 extends from the service terminal 14 to couple to the vehicle 12 when the vehicle 12 is in sufficiently close proximity to the service terminal 14.

Figure 20:
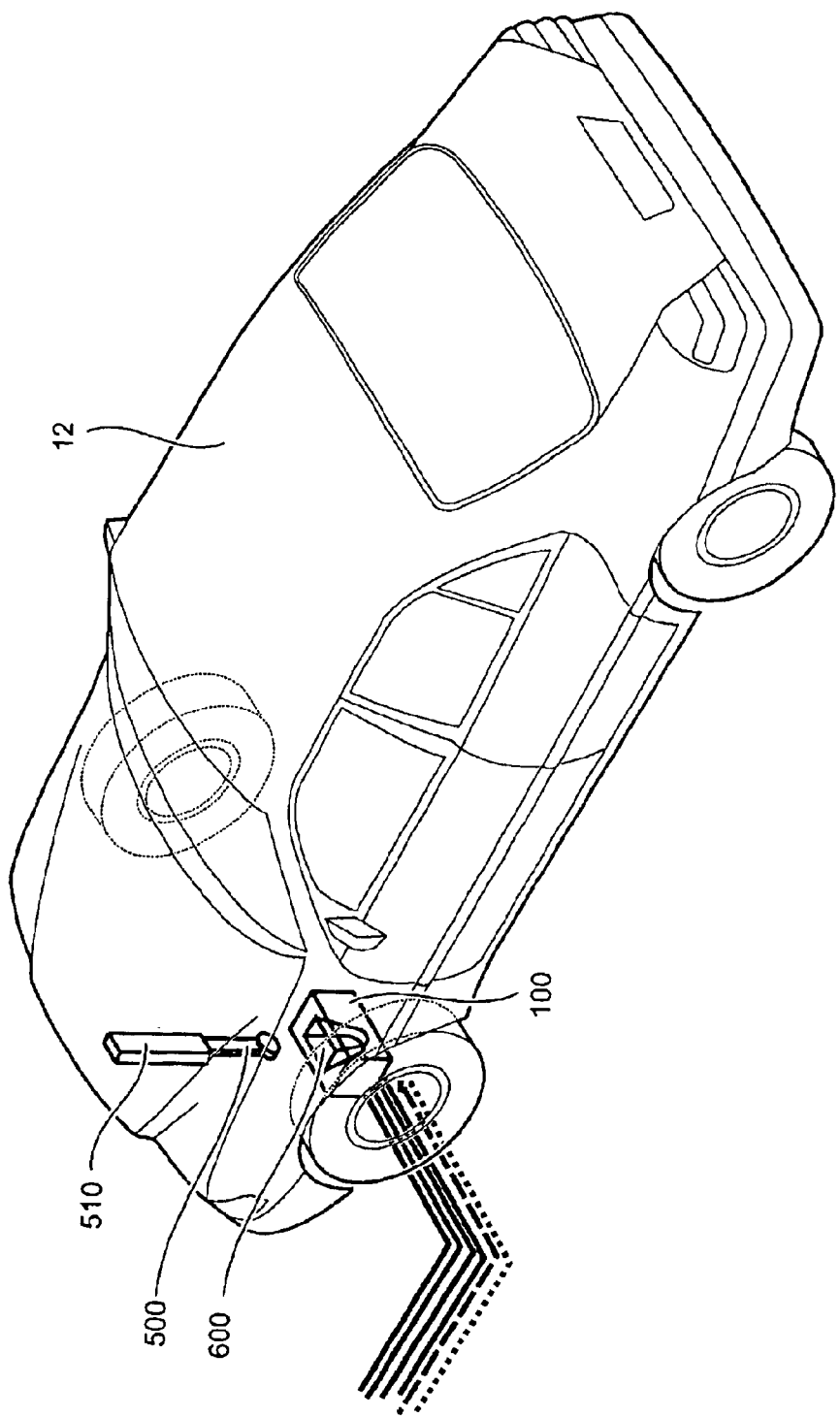
FIG. 20 is a schematic perspective view of a connectivity device lowered from the bottom of a vehicle to mate vertically with an upwards-facing receptacle on a service terminal.

Referring to FIG. 20, the connectivity device 500 is attached to the front underside of the vehicle 12 facing downwards and is deployable in a substantially vertical direction. The deployment apparatus 510 described in the first embodiment may be readily adapted by a person skilled in the art to deploy the connectivity device 500 in this manner and is thus not described here. The service port 100 is embedded in the ground facing upwards towards the connectivity device 500. A door or flap may be provided in the service port 100 to prevent debris and other unwanted material from entering the receptacle 600 inside the service port 100. Otherwise, the design of the service port 100 is the same as in described in the first embodiment.

Figure 21A:
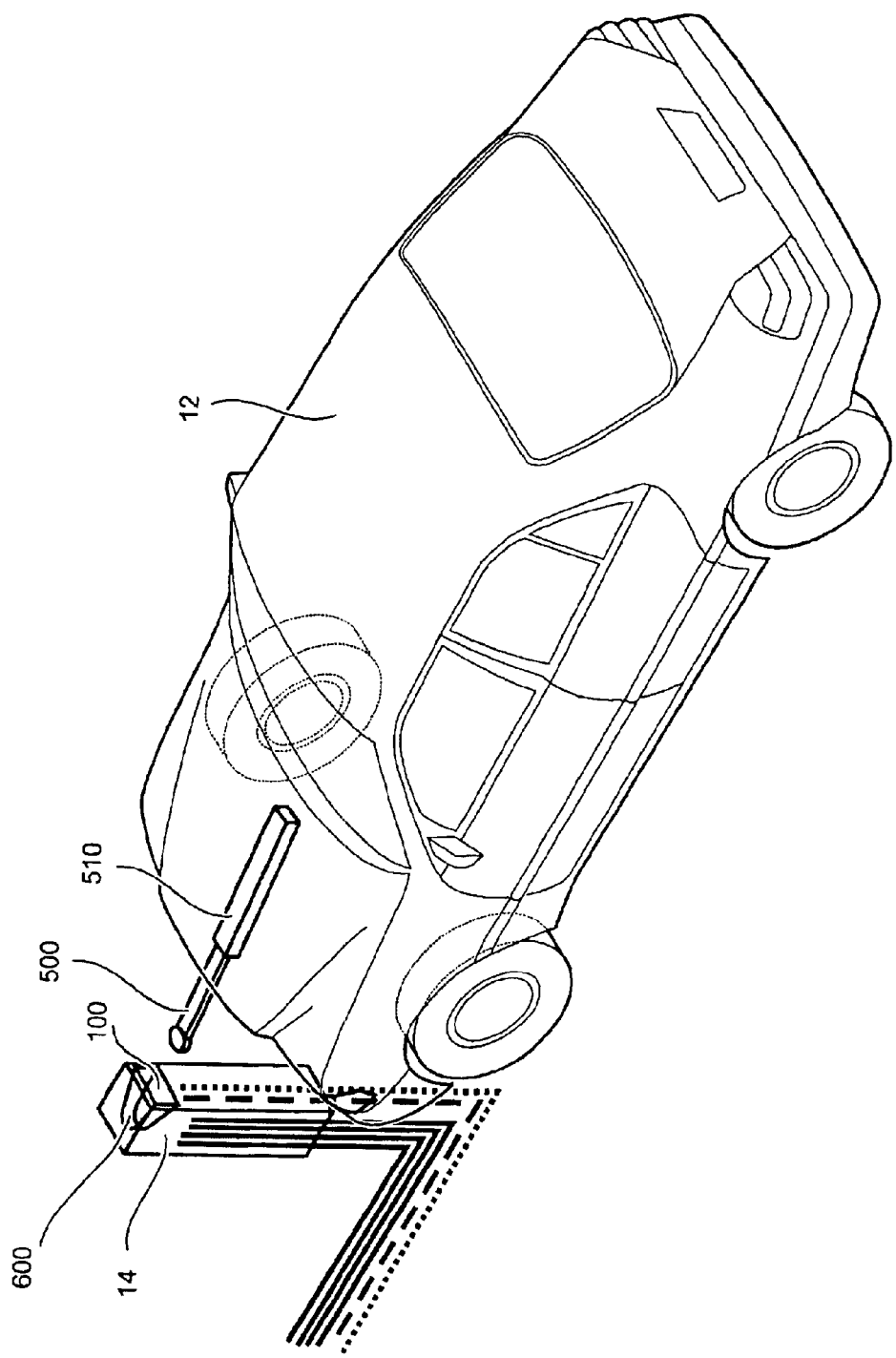
FIGS. 21(a) to (c) are schematic perspective views of connectivity devices extended from various elevated positions on a vehicle to mate horizontally with a horizontally facing receptacle on a service terminal.
Figure 21B:
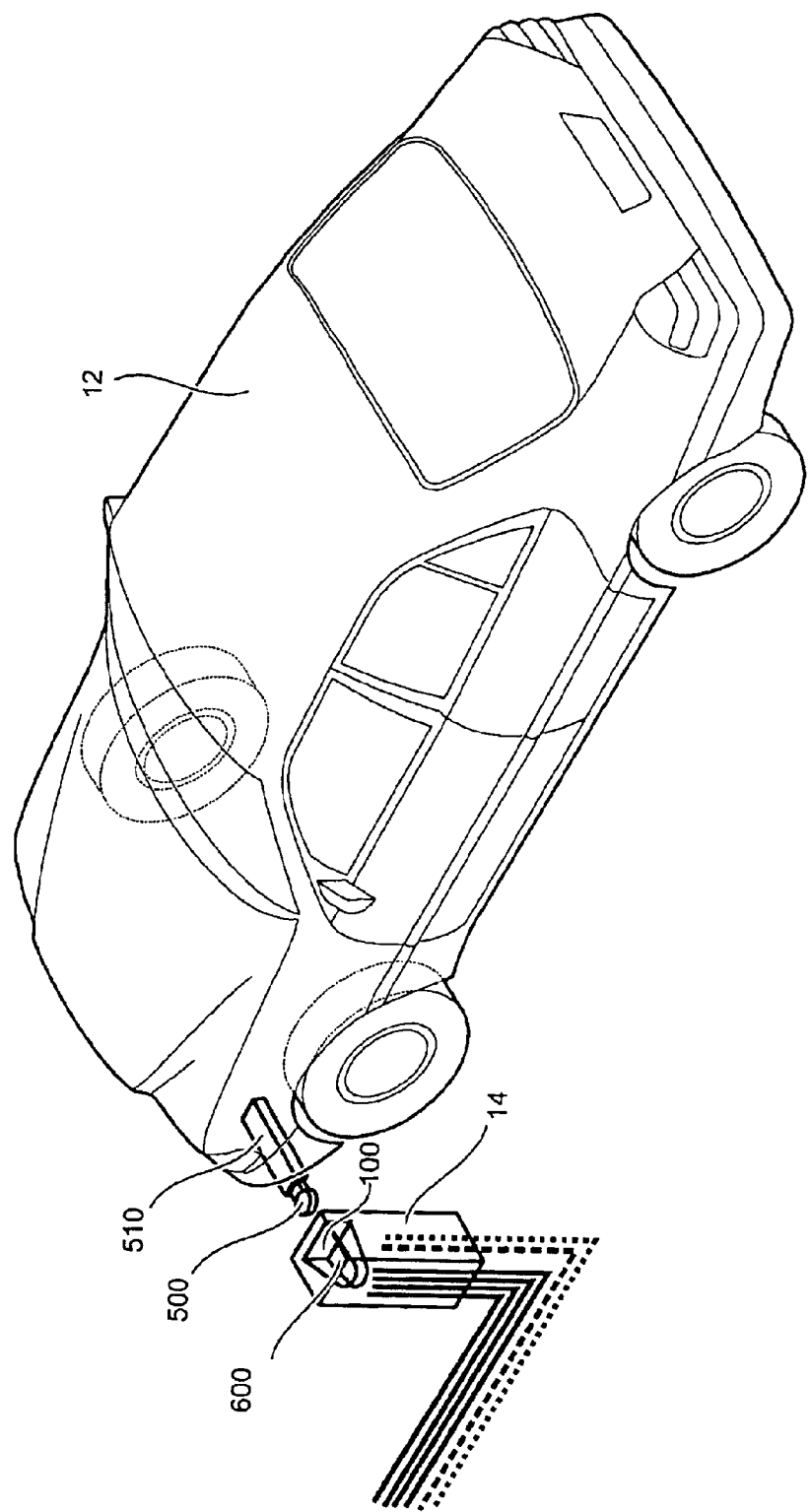
Figure 21C:
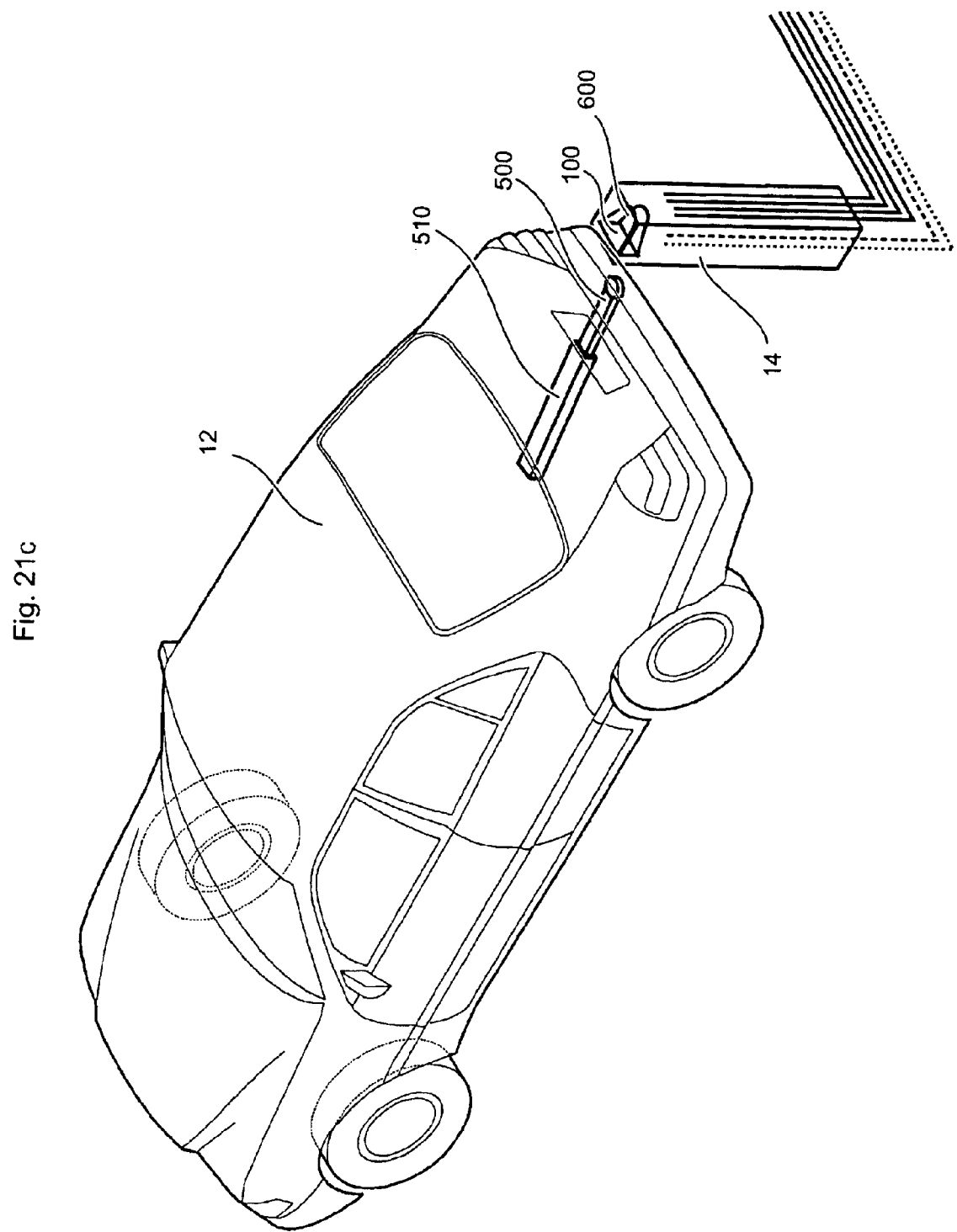

Referring to FIGS. 21(a) to (c), the connectivity device 500 is attached to various parts of the vehicle 12 facing horizontally outwards, and is deployable in a substantially horizontal direction. The deployment apparatus 510 described in the first embodiment may be readily adapted by a person skilled in the art to deploy the connectivity device 500 in this manner and is thus not described here. The service port 100 may be located in a housing of the service terminal 14 at a height that corresponds to the height at which the connectivity device 500 is horizontally deployed. For example and referring to FIG. 21(a), the connectivity device 500 may be deployed forwards from the front bumper of the vehicle 12, and the service port 100 may have a housing that elevates the receptacle 600 to the appropriate height. Referring to FIG. 21(b), the connectivity device 500 may be deployed sideways from the front bumper of the vehicle, and the service port 100 may be located in a housing that corresponds to the height at which the connectivity device 500 is deployed. Referring to FIG. 21(c), the connectivity device 500 may be deployed out of the back bumper of the vehicle 12, and the service port 100 may be elevated to correspond to the height at which the connectivity device 500 is deployed.

Figure 22:
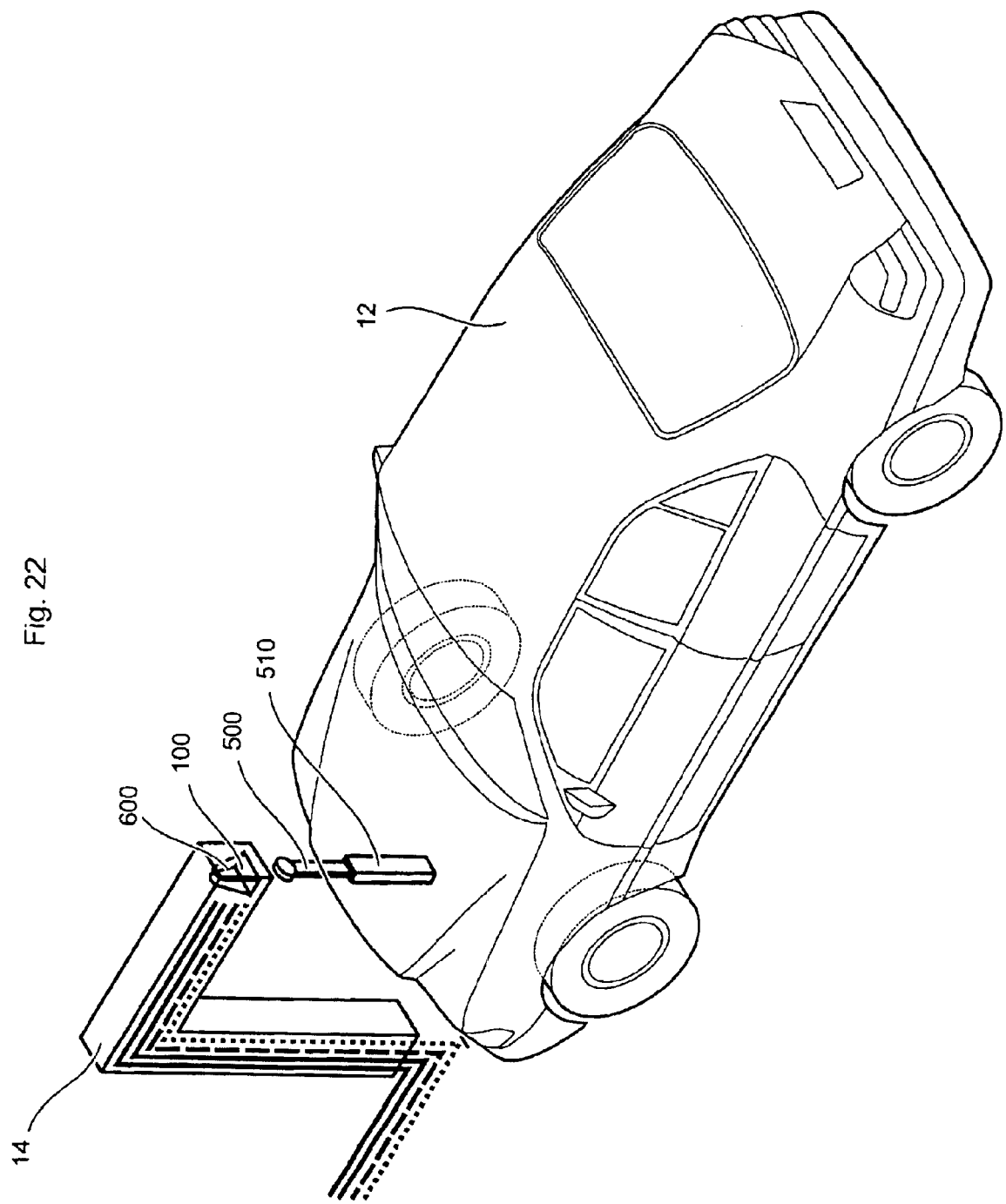
FIG. 22 is a schematic perspective view of a connectivity device raised upwards from a vehicle to mate vertically with a downwards facing receptacle on a service terminal.

Referring to FIG. 22, the connectivity device 500 is attached to the front of the vehicle 12 facing upwards and is deployable in a substantially vertical direction. The deployment apparatus 510 described in the first embodiment may be readily adapted by a person skilled in the art to deploy the connectivity device 500 in this manner and is thus not described here. The service port 100 is located in a housing of the service terminal 14 that rises above the height of the vehicle hood, and faces downwards from towards the upwards-extending connectivity device 500. Otherwise, the design of the service port 100 is the same as in described in the first embodiment.

Figure 23:
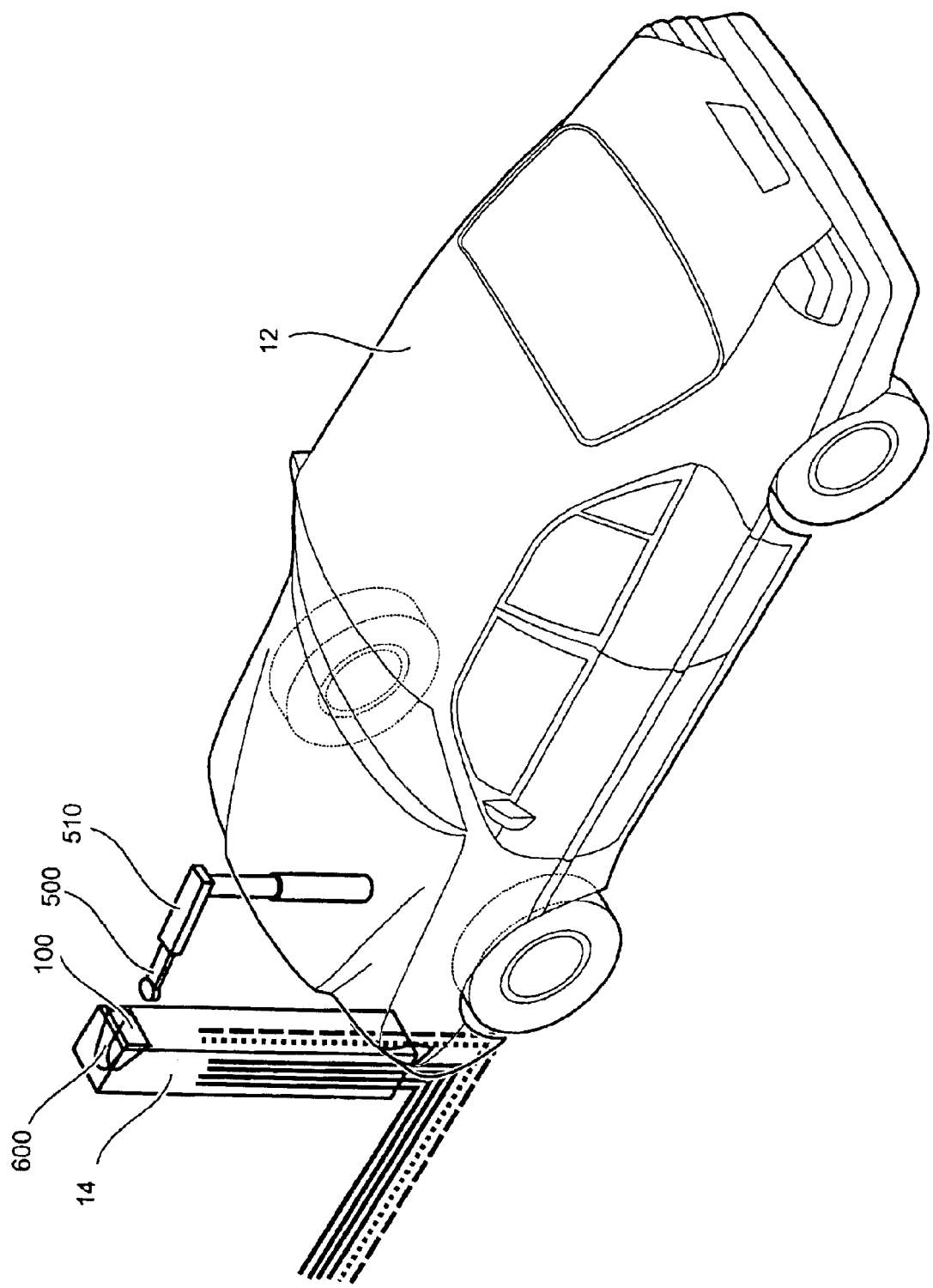
FIG. 23 is a schematic perspective view of a connectivity device raised upwards from a vehicle, then extended horizontally to mate with a receptacle on the service terminal.

Referring to FIG. 23, the connectivity device 500 is attached to the front of the vehicle 12 facing forwards and is deployable in a substantially vertical and horizontal direction and is pivotable about a vertical axis. The deployment apparatus 510 described in the first embodiment may be readily adapted by a person skilled in the art to deploy the connectivity device 500 in this manner and is thus not described here. The service port 100 is located in a housing of the service terminal 14 that rises above the height of the vehicle hood and faces horizontally outwards. Otherwise, the design of the service port 100 is the same as in described in the first embodiment.

Figure 24:
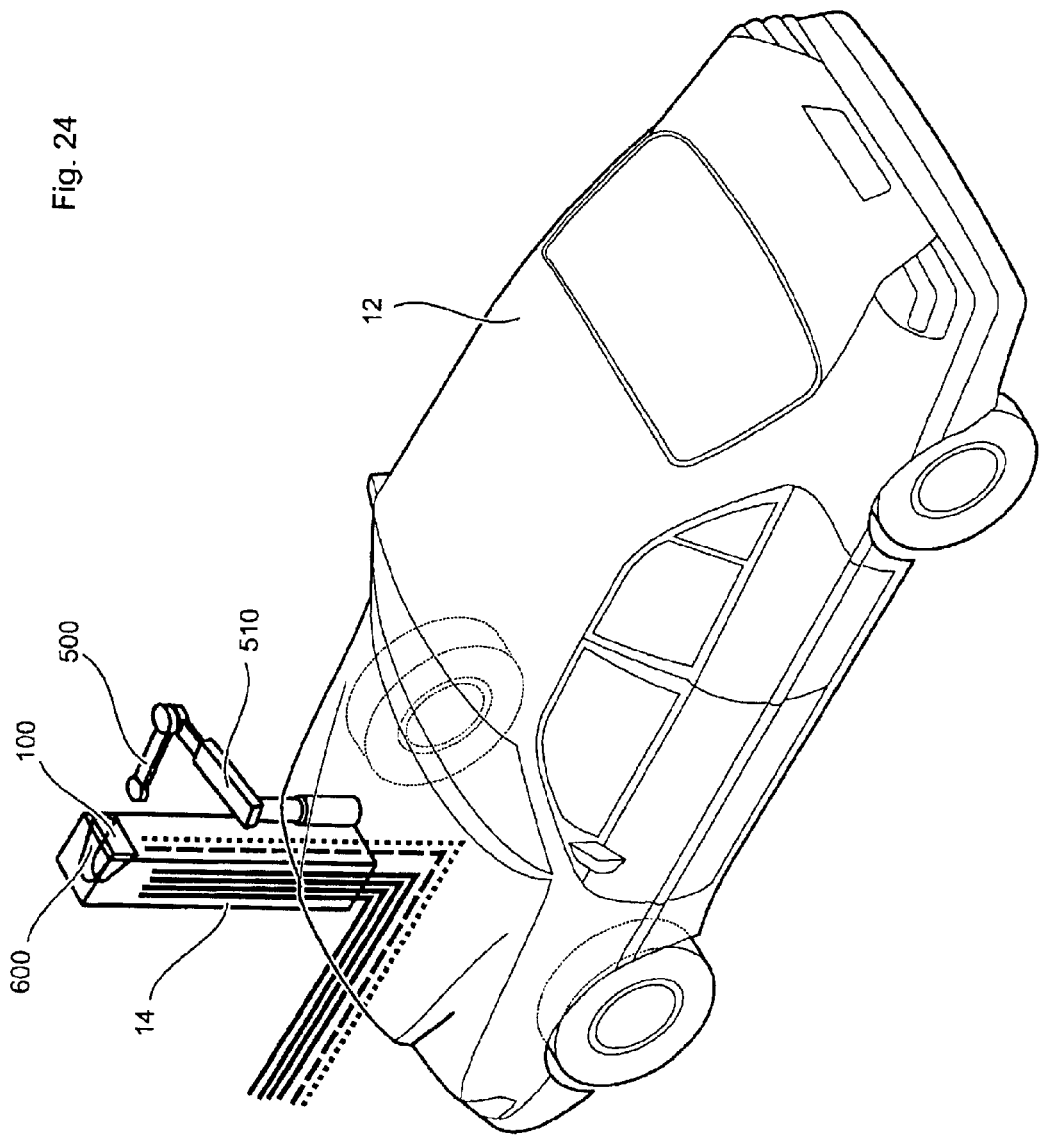
FIG. 24 is a schematic perspective view of a connectivity device having a delivery arm that is extendible in vertical and horizontal directions from a vehicle to mate with a horizontally facing receptacle on a service terminal.

Referring to FIG. 24, the connectivity device 500 is attached to the front of the vehicle 12 facing outwards and is deployable in a substantially vertical and horizontal direction and is pivotable about a pair of vertical axes. In particular, the deployment apparatus 510 has a vertically extendible main arm, a horizontally extendible upper arm having a proximal end pivotably mounted to the distal end of the main arm, and a forearm pivotably mounted at its proximal end to the distal end of the upper arm. The deployment apparatus 510 described in the first embodiment may be readily adapted by a person skilled in the art to deploy the connectivity device 500 in this manner and is thus not described here. The service port 100 is located in a housing of the service terminal 14 that rises above the height of the vehicle hood and faces horizontally outwards. Otherwise, the design of the service port 100 is the same as in described in the first embodiment.

Figure 25:
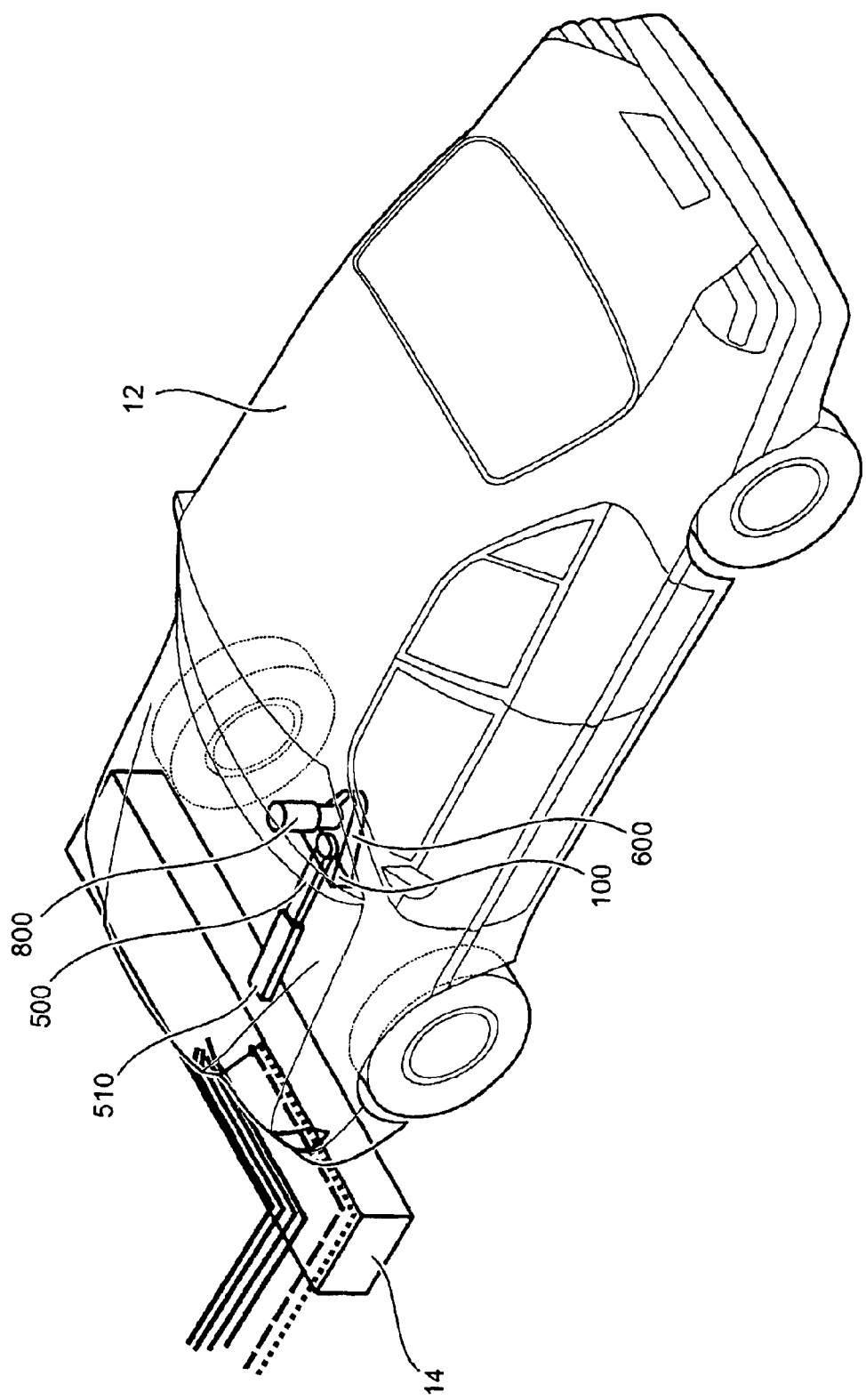
FIG. 25 is a schematic perspective view of a connectivity device extending horizontally from a wheel stop service terminal to mate with a horizontally-facing receptacle lowered from the bottom of a vehicle.

Referring to FIG. 25, the connectivity device 500 is located in a wheel stop of the service terminal 14, and is deployable horizontally or at an angle from the wheel stop. The deployment apparatus 510 described in the first embodiment may be readily adapted by a person skilled in the art to deploy the connectivity device 500 in this manner and is thus not described here. The receptacle 600 of the service port 100 is attached to a receptacle deployment apparatus 800 which is turn is attached to the front underside of the vehicle 12 and is operable to deploy the receptacle 600 downwards to a height corresponding to the connectivity device 500.

Figure 26:
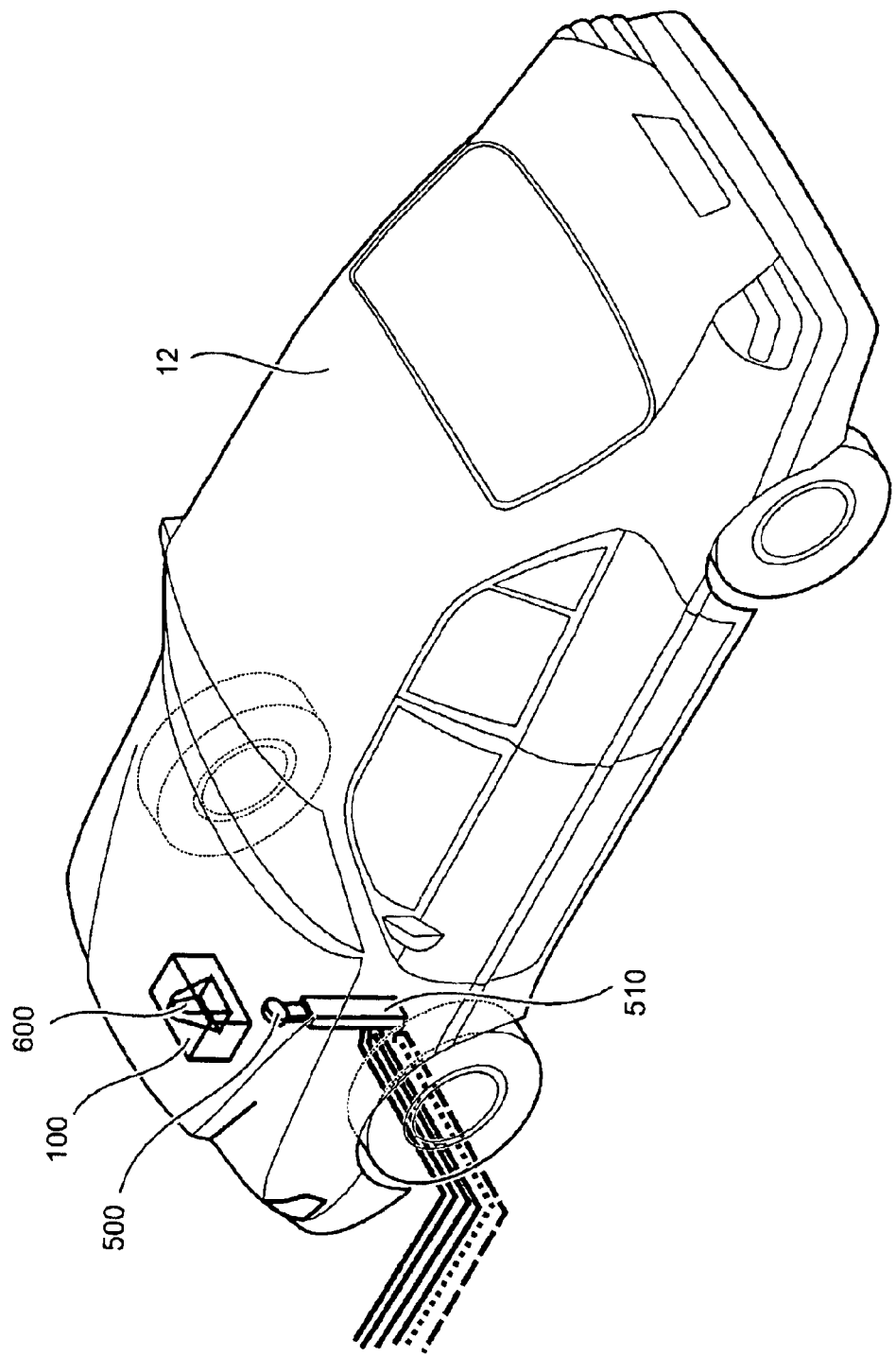
FIG. 26 is a schematic perspective view of a connectivity device extending vertically from a parking surface of a service terminal to mate with a downwardly-facing receptacle on the bottom of a vehicle.

Referring to FIG. 26, the connectivity device 500 is located in a recess in the ground of the service terminal 14 facing upwards and is deployable in a substantially vertical direction. The deployment apparatus 510 of the first embodiment may be readily adapted by a person skilled in the art to deploy the connectivity device 500 in this manner and thus is not described here. A service port 100 is mounted to front underside of the vehicle 12 facing downwards for engagement with the upwardly extending connectivity device 100. Otherwise, the design of the service port 100 is the same as in described in the first embodiment.

Figure 27:
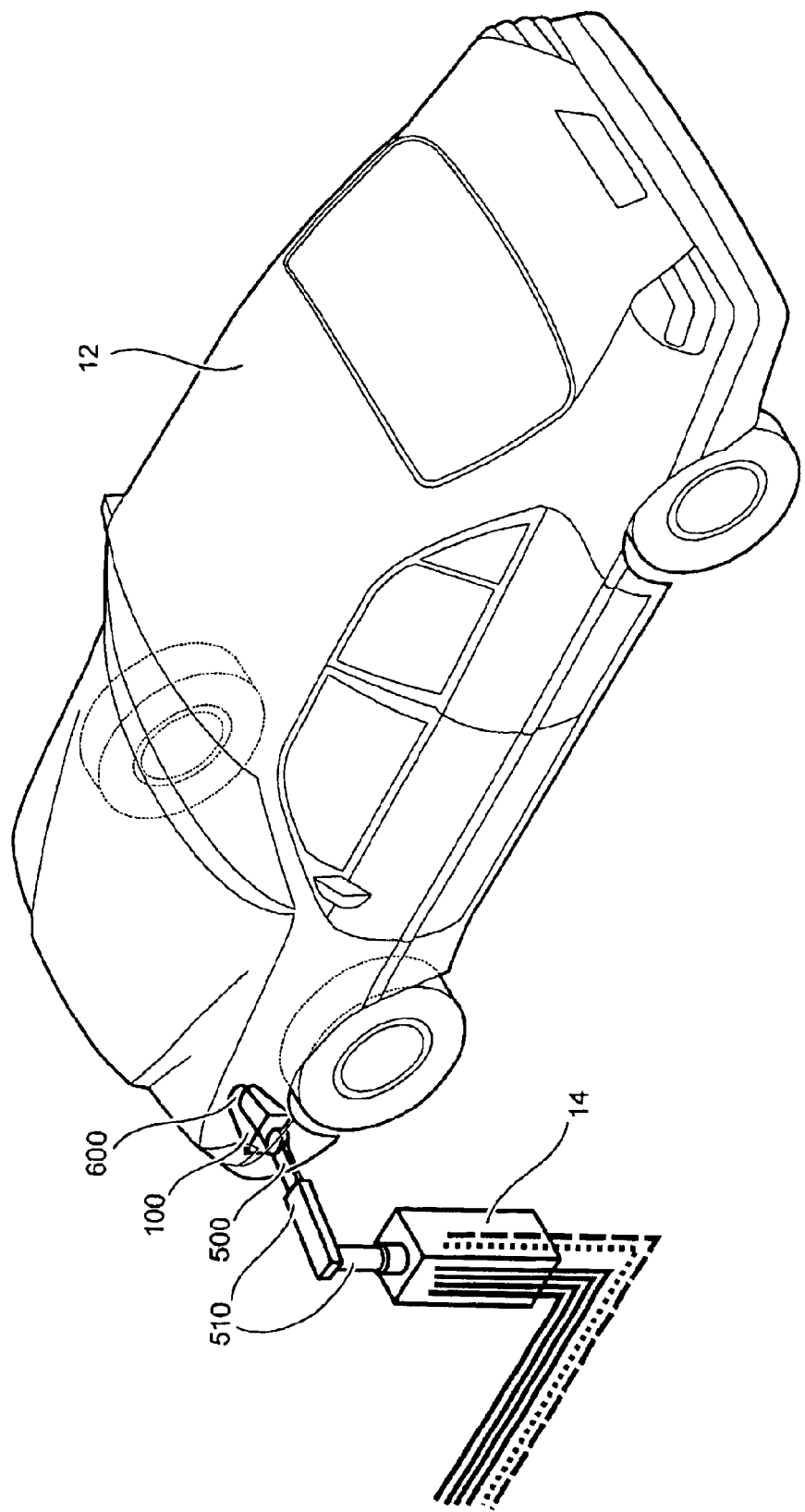
FIG. 27 is a schematic perspective view of a connectivity device extending horizontally from a service terminal to mate with a sideways-facing receptacle on a vehicle.

Referring to FIG. 27, the connectivity device 500 is in a housing of the service terminal 14 facing outwards and is deployable in a substantially vertical and horizontal direction and is pivotable about a vertical axis. The deployment apparatus 510 described in the first embodiment may be readily adapted by a person skilled in the art to deploy the connectivity device 500 in this manner and is thus not described here. The service port 100 is located in the front side of the vehicle 14 facing outwards. Otherwise, the design of the service port 100 is the same as in described in the first embodiment.

Figure 28:
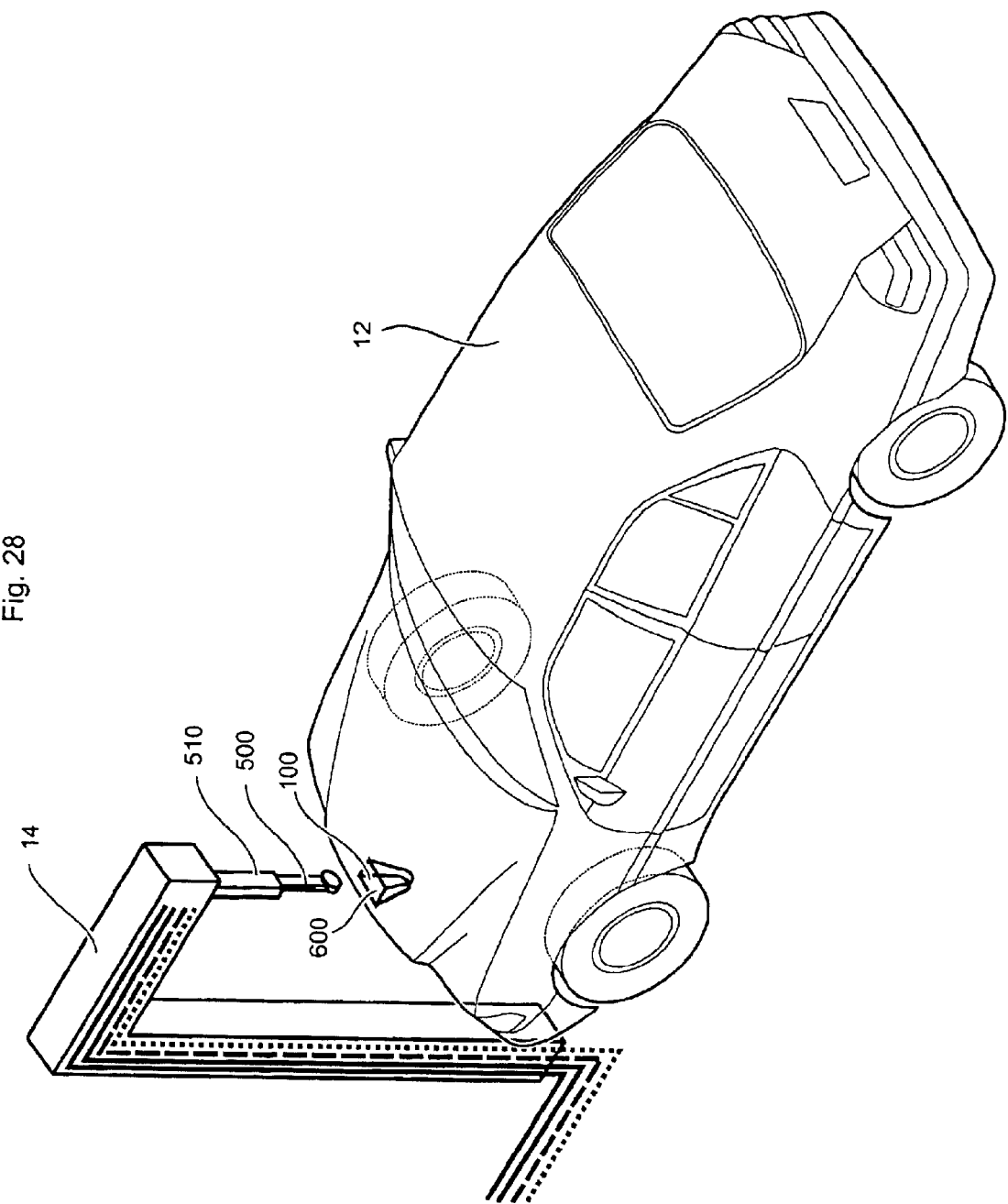
FIG. 28 is a schematic perspective view of a connectivity device extended vertically downwards from a service terminal located above a vehicle to mate with an upwards-facing receptacle on the hood of the vehicle.

Referring to FIG. 28, the connectivity device 500 is in a housing of the service terminal 14 that rises above the vehicle and faces downwards, and is deployable in a substantially vertical direction. The deployment apparatus 510 described in the first embodiment may be readily adapted by a person skilled in the art to deploy the connectivity device 500 in this manner and is thus not described here. The service port 100 is located in the front of the vehicle 14 facing upwards towards the downwards extending connectivity device 500. Otherwise, the design of the service port 100 is the same as in described in the first embodiment.

Figure 29:
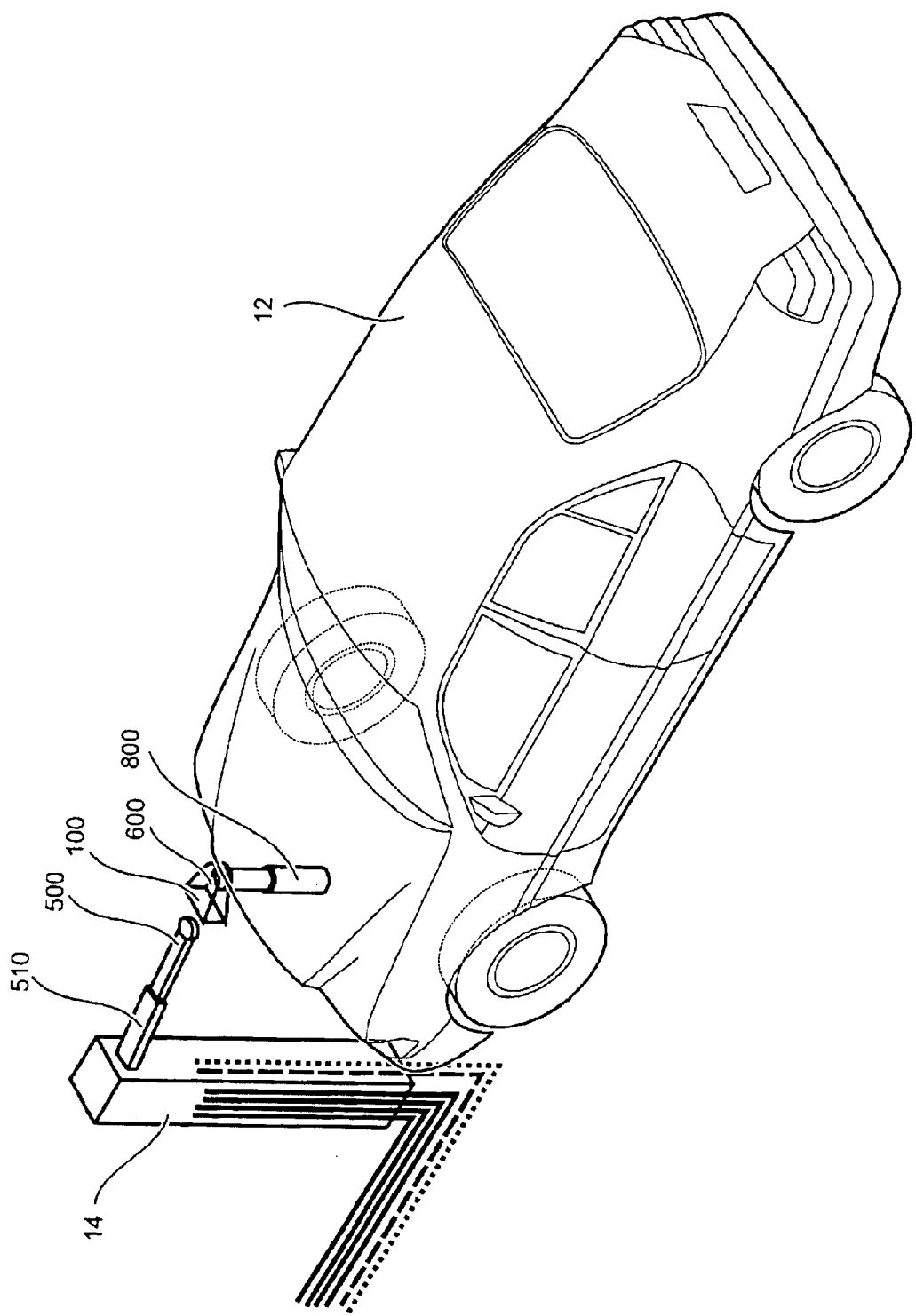
FIG. 29 is a schematic perspective view of a connectivity device extended horizontally from a service terminal to mate with a horizontally-facing receptacle that rises out of the hood of a vehicle.

Referring to FIG. 29, the connectivity device 500 is in a housing of the service terminal 14 facing outwards and is deployable in a substantially horizontal direction. The deployment apparatus 510 described in the first embodiment may be readily adapted by a person skilled in the art to deploy the connectivity device 500 in this manner and is thus not described here. The service port 100 is located in the front of the vehicle 14 facing outwards and is deployable in a substantially vertical direction to bring the service port 100 to the height of the connectivity device 500. Otherwise, the design of the service port 100 is the same as in described in the first embodiment.

Figure 30:
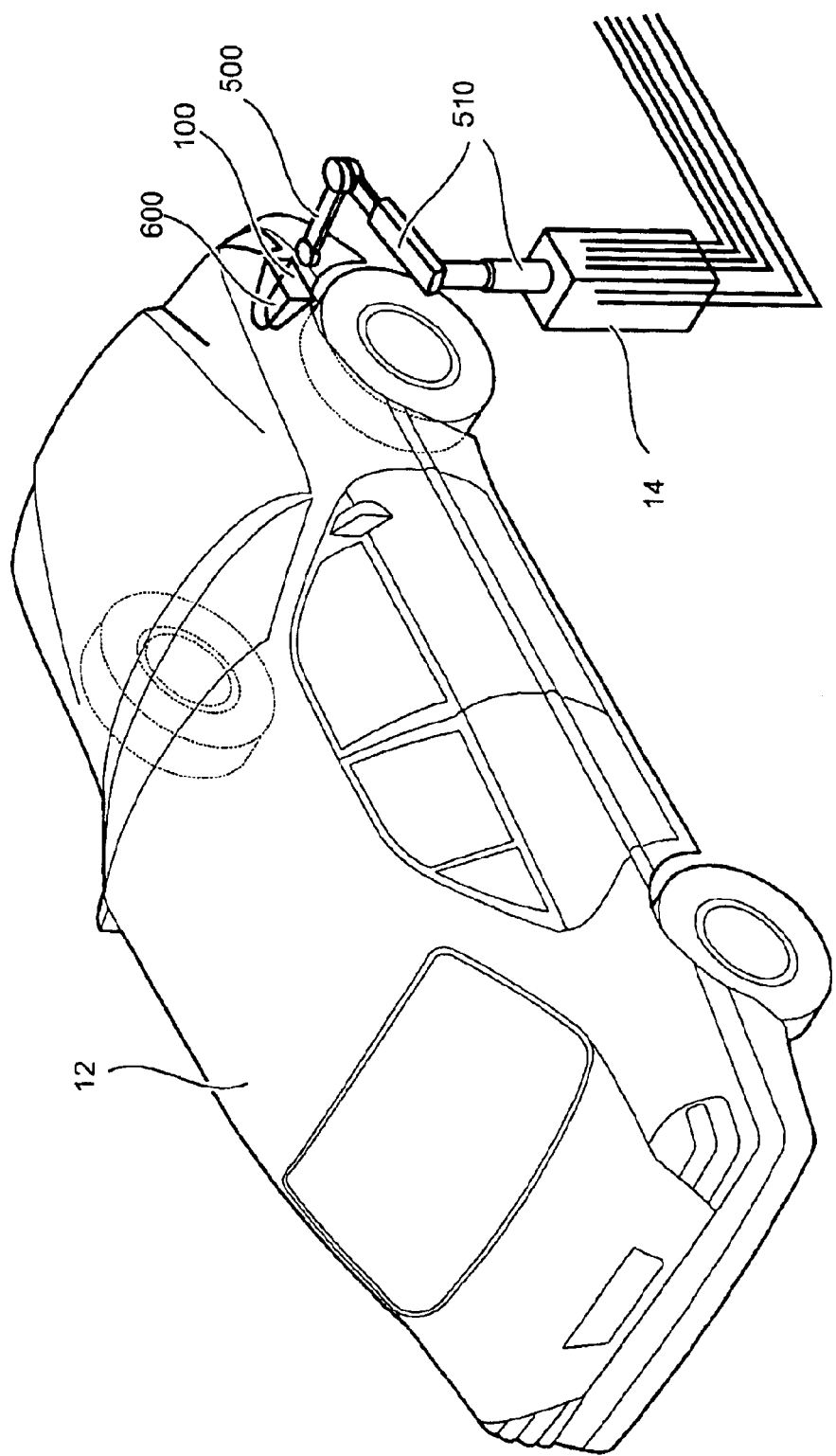
FIG. 30 is a schematic perspective view of a connectivity device having a delivery arm that is extendible in vertical and horizontal directions from a service terminal to mate with a horizontally-facing receptacle at the front a vehicle.

Referring to FIG. 30, the connectivity device 500 is attached to a housing of the service terminal 14 facing outwards and is deployable in a substantially vertical and horizontal direction and is pivotable about a pair of vertical axes. The deployment apparatus 510 resembles that of the embodiment shown in FIG. 22 and may be readily adapted by a person skilled in the art to deploy the connectivity device 500 in this manner and is thus not described here. The service port 100 is located in the front side of the vehicle 12 and faces horizontally outwards. Otherwise, the design of the service port 100 is the same as in described in the first embodiment.

While the preferred embodiment of the invention has been illustrated and described, it will be appreciated that various changes can be made therein without departing from the scope and spirit of the invention.

What is claimed is:

1. A service port for automatically engaging a plug, having a service exchange interface, wherein the plug is capable of coupling to one and the service port is capable of coupling to the other of a vehicle and a service terminal; the service port comprising:
    (a) a receptacle comprising
        (i) a clamp positioned within an interior portion of the receptacle, the clamp having a first clamp portion and an opposing second clamp portion;
        (ii) a clamp actuator coupled to the clamp and operable to move the first clamp portion between a clamped position and an unclamped position;
        (iii) a service exchange interface positioned on at least one of the first and second clamp portions; and
        (iv) at least one sensor positioned within the interior portion of the receptacle and configured to monitor the engagement of the plug with the receptacle when the plug is positioned inside the receptacle; and
    (b) a controller electrically coupled to the sensor and to the actuator, the controller being configured to:
        (i) monitor a signal received from the sensor; and in response to the signal, to instruct the actuator to move the first clamp portion until the service exchange interface positioned on at least one of the first and second clamp portions is operably engaged with a corresponding service exchange interface on the plug.

2. The service port of claim 1 wherein the receptacle comprises a pair of service exchange interfaces attached to the respective first and second clamp portions.

3. The service port of claim 1 wherein the receptacle comprises a cover attached to a cover actuator that moves the cover between a first position and a second position, and wherein the controller is electrically communicative with the cover actuator and is programmed to move the cover to the first position before the plug enters the receptacle, and to move the cover to the second position when the plug is withdrawn from the receptacle.

4. The service port of claim 1 comprising a transceiver electrically connected to the controller for communicating with a vehicle or service terminal connected to the plug, and wherein the controller is further programmed to communicate via the transceiver to the vehicle or service terminal connected to the plug that an engagement has been established and that the service port is ready to exchange services.

5. The service port of claim 1 wherein the service exchange interface comprises an interface configured to exchange one or more services including hydrogen, water, and electricity.

6. The service port of claim 5 wherein the service exchange interface comprises an electrical contact and an electrical connector connected to the contact and connectable to one of the vehicle and the service terminal.

7. The service port of claim 5 wherein the service exchange interface comprises a fluid valve assembly and a fluid conduit connected to the valve assembly and connectable to one of the vehicle and the service terminal.

8. The service port of claim 7 wherein the at least one sensor comprises a force sensor configured to detect the clamping force exerted by one of the first clamp portion and the second clamp portion against the plug, and the controller is programmed to stop operation of the actuator when a predetermined clamping force exerted on the plug is sensed by the force sensor.

9. The service port of claim 1 wherein the service port is configured to couple to the service terminal and the plug is configured to couple to the vehicle.

10. The service port of claim 9 wherein the service port is embeddable in a vehicle parking surface of the service terminal so that the receptacle faces outwardly from the parking surface, and the plug is configured to move inwardly towards the receptacle.

11. The service port of claim 9 wherein the service port is elevated above a vehicle parking surface, and the plug is configured to move inwardly.

12. The service port of claim 11 wherein the plug is translatable in a direction perpendicular to the vehicle parking surface.

13. The service port of claim 12 wherein the plug is rotatable about an axis perpendicular to the vehicle parking surface.

14. The service port of claim 1 wherein the service port is configured to couple to the vehicle and the plug is configured to couple to the service terminal.

15. The service port of claim 14 wherein the plug is configured to couple to a receptacle of a service terminal and is movable inwardly towards the receptacle, and the service port is configured to couple to the vehicle and wherein the service port further comprises a deployment apparatus attached to the receptacle that also moves the receptacle to an elevation corresponding to the plug.

16. The service port as claimed in claim 14 wherein the plug is embeddable in a vehicle parking surface of the service terminal so that the plug faces outwardly from the parking surface and is movable in a direction perpendicular to the parking surface, and the service port is coupled to the and positioned to receive the plug.

17. The service port of claim 14 wherein the plug is coupled to the service terminal and is configured to be deployable in a horizontal direction and the service port is coupled to the vehicle and is positioned to receive the plug.

18. The service port of claim 17 wherein the plug is translatable in a vertical direction to an elevation corresponding to an elevation of the service port.

19. The service port of claim 18 wherein the plug is rotatable about an axis perpendicular to the vehicle parking surface.

20. The service port of claim 18 wherein the service port is connected to a deployment apparatus operable to move the service port in a vertical direction to an elevation corresponding to the elevation of the plug.

21. A method of automatically engaging a service port having a service exchange interface and a plug having a service exchange interface, wherein the plug is capable of coupling to one and the service port is capable of coupling to the other of a vehicle and a service terminal; the method comprising (a) inserting a plug into a receptacle of a service port;

(b) detecting that the plug is suitably positioned inside the receptacle;

(c) applying a clamping force to the plug such that a service exchange interface on the plug engages a service exchange interface on the receptacle with sufficient force to enable a service to be exchanged between the interfaces, and (d) initiating a service exchange between the plug and service port through the respective service exchange interfaces, the initiating of the service exchange comprising exchanging a fluid, including hydrogen, water, and electricity, and includes transferring electricity.

22. The method of claim 21 further comprising receiving instructions to initiate engagement with the plug, and moving a protective cover to expose the receptacle to the plug.

23. The method of claim 21 wherein the service exchange interface on the plug and the receptacle are configured to exchange a fluid, and wherein clamping comprises monitoring the clamping force exerted on the plug, and increasing the clamping force on the plug until a clamping force sufficient to sealably establish fluid communication between the plug service exchange interface and receptacle service exchange interface is detected.

24. The method of claim 21 wherein initiating a service exchange further comprises opening a fluid valve on the receptacle service exchange interface and advising at least one of the vehicle and the service terminal that the service port is ready to exchange a fluid.

25. The method of claim 21 wherein applying a clamping force comprises applying a clamping force to the plug with sufficient force that hydrogen, water and electricity are exchangeable between the plug and the service port.

26. The method of claim 21 wherein clamping comprises monitoring the clamping force on the plug, and increasing a clamping force on the plug until a clamping force is detected that is sufficient to establish an electrical connection between the plug service exchange interface and the receptacle service exchange interface.

27. The method of claim 26 wherein initiating a service exchange further comprises advising at least one of the vehicle and the service terminal that the service port is ready to exchange electricity.

28. A service port for automatically engaging a plug having at least one service exchange interface, wherein the plug is capable of coupling to one and the service port is capable of coupling to the other of a vehicle and a service terminal; the service port comprising:

(a) a receptacle comprising:

(i) a clamp positioned inside the receptacle, the clamp having a first clamp portion and an opposing second clamp portion, the first clamp portion and the second clamp portion being configured to receive the plug therebetween;

(ii) a clamp actuator coupled to the second clamp portion for moving the second clamp portion between a clamped position and an unclamped position;

(iii) a service exchange interface positioned on at least one of the first and second clamp portions; and (iv) at least one sensor positioned within the receptacle and configured to monitor the engagement of the plug with the receptacle when the plug is engageably received by the receptacle; and (b) a controller coupled to the at least one sensor and the actuator, the controller being configured to monitor a signal received from the at least one sensor, the signal indicating that the plug is properly positioned for engagement with the first clamp portion and the second clamp portion and to instruct the actuator to move the first clamp portion into a positive engagement with a corresponding service exchange interface on the plug.

29. The service port of claim 28 wherein at least one sensor comprises a force sensor configured to detect the clamping force exerted by at least one of the first and the second clamp portions against the plug, and the controller is programmed to stop operation of the actuator when a sufficient clamping force is exerted on the plug.

30. The service port of claim 28 wherein the service exchange interface comprises an electrical contact and an electrical connector connected to the contact and connectable to one of the vehicle and the service terminal.

31. The service port of claim 28 wherein the receptacle has a first service exchange interface and a second service exchange interface attached to respective first and second clamp portions.

32. The service port of claim 28 wherein the service exchange interface comprises an interface configured to exchange one or more services including water, hydrogen and electricity.

33. The service port of claim 32 wherein the service exchange interface comprises a fluid valve assembly and a fluid conduit connected to the valve assembly and connectable to one of the vehicle and the service terminal.

* * * * *